Dec. 14, 1965   E. HOSE   3,223,998
ELECTRONIC TRACKING SYSTEM EMPLOYING SLANT RANGE MEASUREMENTS
Filed April 6, 1962   9 Sheets-Sheet 1

INVENTOR.
Eddy Hose

INVENTOR.
Eddy Hose

INVENTOR.
Eddy Hose

INVENTOR.
Eddy Hose

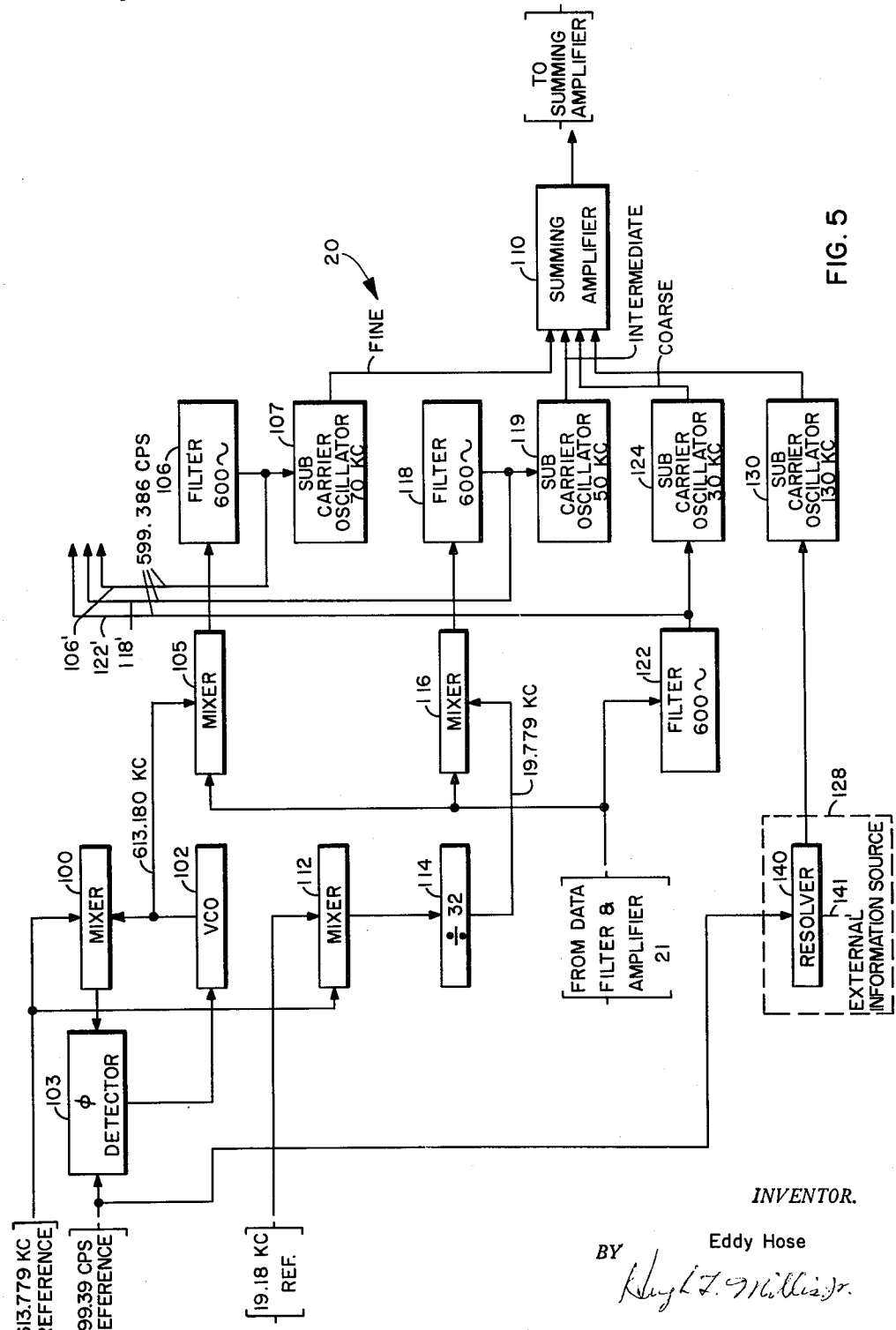

INVENTOR.
Eddy Hose

INVENTOR.
Eddy Hose

United States Patent Office 3,223,998
Patented Dec. 14, 1965

3,223,998
ELECTRONIC TRACKING SYSTEM EMPLOYING SLANT RANGE MEASUREMENTS
Eddy Hose, San Diego, Calif., assignor to Cubic Corporation, San Diego, Calif., a corporation of California
Filed Apr. 6, 1962, Ser. No. 185,564
19 Claims. (Cl. 343—12)

The present invention relates to an electronic tracking system employing slant range measurements and, in particular, to an electronic system which may furnish position data of a moving vehicle either at the vehicle itself or at any of one of three fixed ground stations.

The electronic system according to the present invention sequentially acquires information of the slant range between a moving interrogator station and three fixed responder stations by use of DME or distance measuring equipment employing phase comparison techniques. The three slant ranges thus determined are, assuming the station coordinates of the fixed ground stations are known, sufficient to locate the moving station in spatial coordinate form. Another electronic system having a common assignee with the present application and also deriving slant range information is found in a co-pending U.S. application for patent entitled "A Sequenced Spatial Coordinate Determining System," Serial No. 737,446, filed May 23, 1958, to Robert V. Werner, Walter J. Zable and William J. Thompson, now U.S. Patent No. 3,111,665, issued November 18, 1963. According to the system therein described, a single transponder, i.e., responder, is located in a target vehicle, with one of three associated ground stations selected to act as a, as termed, Master station and the two remaining stations as Slave No. 1 and Slave No. 2.

The Master station independently interrogates the responder at periodic intervals, each interrogation requiring about the first third of each interval time. The Master station, during each of its interrogations, effectively determines its own slant range to the moving responder in a servo readout section. Then, the Slave No. 1 ground station, after detecting the Master station's interrogation interval, independently interrogates the responder during the middle third of each interrogation cycle and during this time, establishes its own slant range to the airborne unit in an associated servo readout section. The final or Slave No. 2 ground station interrogates the transponder during the final third of each cycle and likewise determines its own slant range to the responder during this time.

The present system, although making use of phase comparison techniques for determining slant ranges between one moving station and each of three fixed ground stations, as did the prior mentioned system, nonetheless represents a considerable improvement thereof in terms of utility, flexibility, simplicity and cost. In particular, only one interrogator station is employed and this station is placed in the moving vehicle while the previously noted three ground stations are simple responders rather than interrogators, as in the previous system. In the present system, three ranging signals are continuously modulated on the airborne interrogator's carrier signal while three keying signals are sequentially modulated on the carrier. The three ground-based responders individually respond to different keying signals to return the received ranging signals, also modulated on a carrier signal. The ranging signals received at the interrogator from each responder are placed on separate subcarrier signals and telemetered back to the ground by way of the interrogator's carrier signal.

By employing this general arrangement, a data readout operation may be performed at the interrogator station in the moving vehicle by comparing the phases between the originally generated reference range signals and the data range signals returned from each responder. Or, a data readout station may be associated with any of the ground-based responder stations where it would compare the phases between the directly modulated range signals and the telemetered data signals for each responder. On the other hand, slant ranges were individually produced, considering the system of the previously referred to application for patent, at the Master and each of the Slave stations corresponding only to their own slant ranges to the responder. Hence, the utility of the previous system is somewhat lessened, especially for real time tracking applications, owing to the physical separation between the various slant ranges produced.

In mechanizing the principal characteristics of the present system as outlined above, several features are incorporated which serve to enhance the system's performance. In particular, certain studies have indicated that multipath effects may be minimized by employing high modulation indices for the ranging signals, particularly the fine channel frequency which determines the basic system accuracy. To accommodate a high modulation index in which most of the carrier signal frequency energy is transferred to the sidebands, both a narrow-band and a wide-band channel are employed in the receiver just following the I.-F. channel. The narrow-band channel is primarily employed for frequency and phase-locking the oncoming I.-F. signal with an internally generated reference signal in order to preserve the distance measuring accuracies in the ranging signal's phases.

In particular, at the beginning of each responder interrogation cycle, the range signals are not modulated on the interrogator carrier signal in order that phase-lock may be obtained through the narrow-band channel of the selected responder, since the major energy in the carrier signal will be at the carrier frequency. Then the ranging signal amplitudes are then linearly increased for a few milliseconds until the noted high modulation index is obtained. Then, by employing a heavy range signal negative feed-back loop from the output of the wide-band channel to the receiver input, both internal circuitry phase shifts are cancelled out and modulation wipe-off is obtained with normal receiver operation resulting at the required I.-F. signal phase-lock condition. The ranging signals, in each activated responder, are detected following the wide-band channel and then modulated on an offset frequency carrier signal for retransmission back to the interrogator station.

The readout unit employed in the interrogator effectively compares the phases of the reference range signals against those returned from each of the responders and produces output binary numbers corresponding to the various slant ranges. On the other hand, since the data range signals appearing at the interrogator from all responders are telemetered back on the interrogator carrier signal, these telemetered signals can be demodulated at any of the responder stations and phase compared against the normally modulated ranging signals to derive slant range information between each responder and the interrogator. This is possible since each responder can determine its own slant range to the interrogator and, by effectively subtracting out this slant range, determine the remaining responders' slant ranges to the interrogator. Hence separate slant range measurements between the interrogator and all three responders can be made at any of the responders.

A range memory unit constitutes the principal circuit in the readout section of the present system, one being employed for each of the three range signals for each of the responders, regardless of where the readout unit is placed. Essentially, the range memory includes a voltage controlled oscillator, or VCO, which, during the "on" time of its associated responder, is driven by an associated electronic servo system to be in exact phase-lock with its associated input data signal. In addition, the servo loop associated with the VCO produces information, in the form of capacitor charges, which corresponds to the phase itself and the rate of change of phase. Hence, during each succeeding "off" time, the VCO continues to be driven such that its phase and rate of change of phase corresponds, in these characteristics, to the data signal at its previous sample time. By this technique then, since all range memory loops are driven to correspond phase-wise to their associated range signal, readout may be performed, by taking phase differences, at any instant, and hence independently of the sample intervals. Accordingly, slant ranges may be derived independently of the interrogator-responder sequencing rate and this feature also acts to enhance the general utility of the overall system.

It is accordingly the principal object of the present invention to provide an electronic system including an interrogator which sequentially interrogates three responder stations and in which slant range measurements between the interrogator and each of the responders may be taken at either the interrogator or any of the responder stations based on the interrogations.

Another object of the present invention is to provide a slant range measuring system including an interrogator transmitting a plurality of ranging signals and a sequence of different keying signals to a series of transponders which sequentially respond to the transmitted keying signals for returning the ranging signals whereby the slant range between the interrogator and each of the responders may be determined.

A further object of the present invention is to provide a distance measuring system including an interrogator and at least a single responder in which the interrogator transmits a plurality of ranging signals to the responder, the responder returns the ranging signals and the interrogator then additionally telemeters back the returned ranging signals to the responder whereby slant range measurements may be made at either the interrogator or the responder.

Still another object of the present invention is to provide an electronic slant range measuring system which includes an interrogator which sequentially transmits and receives a plurality of ranging signals from each of a series of responder stations and telemeters back each of the plurality of range signals received from each of the responders whereby measurements can be made at either the interrogator or at any of the responders of the slant range distance between the interrogator and each of the series of responders.

Another object of the present invention is to provide an electronic tracking system which includes an interrogator transmitting a plurality of ranging signals and a sequence of keying tones to a number of ground-based responders which respond to individual keying tones of said sequence for returning the ranging signals and in which the interrogator additionally telemeters back the ranging signals received from each responder so that slant range measurements may be made between each responder and the interrogator at any of the responder stations or at the interrogator.

A further object of the present invention is to provide an electronic tracking system including an interrogator which transmits a plurality of ranging signals and a sequence of keying tones which are received by a series of ground-based responders, the responders individually acting on separate keying tones of the keying tone sequence for returning the ranging signals so that the slant range distance between the interrogator and each of the responders may be determined at the interrogator by comparing the phases between the originally transmitted plurality of ranging signals and those returned from each transponder, the interrogator additionally telemetering back the plurality of ranging signals received back from each responder in order that slant range distances between each responder and the interrogator may be determined at any of the responders by phase comparing the directly received plurality of ranging signals and those telemetered back from the interrogator from each responder.

A still further object of the present invention is to provide a distance measuring system including an interrogator which intermittently transmits at least one ranging signal to a responder, the responder retransmitting the ranging signal which is then telemetered back to the responder from the interrogator, the responder including one oscillator which is driven to be phase-locked with the directly received ranging signal during its transmission and another oscillator which is driven to be phase-locked with the telemetered ranging signal during its transmission, with the result that the phase difference between the two oscillator signals can be measured at any time to determine slant range information between the interrogator and the responder.

Another object of the present invention is to provide an interrogator and responder in which ranging signals are intermittently transmitted from the interrogator to the responder and back again, the signals received at the interrogator being additionally telemetered back to the responder where separate oscillators are driven to phase-lock condition with each of the direct and each of the telemetered ranging signals during the interrogation intervals and remain in substantial phase-lock condition between the interrogation intervals so that phase difference measurements may be taken at any instant between the sets of oscillator signals in complete independence of the interrogation cycles to determine slant range information between the interrogator and responder.

Still another object of the present invention is to provide an interrogator and at least one responder in which ranging signals are intermittently modulated on a carrier signal and transmitted from the interrogator to the responder, the responder including a narrow-band I.-F. amplifier which employs the unmodulated carrier signal transmitted by the interrogator for phase and frequency locking its own I.-F. signal to an internally generated signal in order to preserve phase accuracy information in the ranging signal, and a wide-band I.-F. amplifier which passes and demodulates the ranging signals during their transmission and applies them as feedback signals to the responder receiver where modulation wipeoff is effected and internal circuit phase shifts are cancelled with the result that the phase differences between the demodulated ranging signals and the originally transmitted ranging signals from the interrogator represents slant range distance information between the interrogator and the responder.

A further object of the present invention is to provide an interrogator and a series of responders, the interrogator carrier signal being intermittently modulated by a plurality of ranging signals and sequentially modulated by a series of keying signals corresponding to the series of respective responders, each of the responders including a pair of I.-F. amplifiers one of which responds to the unmodulated carrier signal from the interrogator for locking its I.-F. center signal to a predetermined phase and frequency, the other I.-F. amplifier responding to the appearance of its particular corresponding keying signal for passing the plurality of ranging signals where they are demodulated and applied back to the receiver as a degenerative feedback signal for effecting modulation wipeoff and cancelling internal circuit produced phase shifts in the ranging signals, each of the responders additionally retransmitting its received ranging signals to the interrogator unit which then acts to telemeter the ranging signals back to the responders by which slant range information may be derived at any of the responders of the slant range distance between the interrogator and each of the responders.

Other objects, features and attendant advantages of the present invention will become more apparent to those skilled in the art as the following disclosure is set forth including a detailed description of a preferred embodiment of the invention as illustrated in the accompanying sheets of drawings, in which:

FIGURE 5 is a block diagrammatic representation of the data translator;

Figure 1:
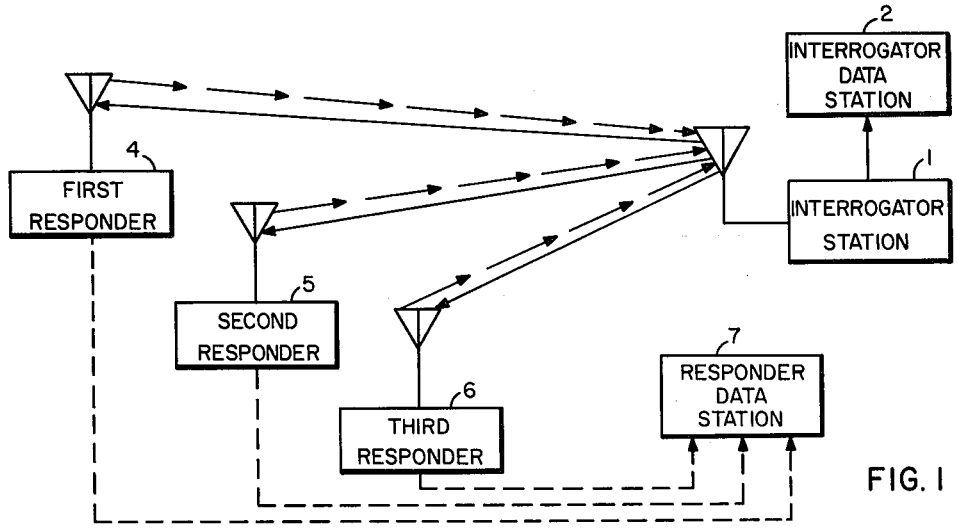
FIGURE 1 is a block diagrammatic illustration showing the principal units constituting the system of the present invention.

FIGURE 1 illustrates the general system configuration according to the present invention, the system including interrogator station 1 which may be located on a moving vehicle, for example, an aircraft, a ship, or land vehicle. An interrogator data station 2 is associated with interrogator 1 and may be employed to produce output information representing the location of station 1, assuming the locations of the other responder stations are initially known. Three fixed stations, a first responder 4, a second responder 5, and a third responder 6 are illustrated, each being in signal communication with interrogator station 1. Finally, a responder data station 7 is indicated which may be coupled, as indicated by the dotted lines, to any of the responders and produce interrogator location information.

In operation, three ranging signals having frequencies of approximately 599 c.p.s., 19 kc., and 613 kc. are generated in the interrogator station 1 and modulated on an outgoing carrier signal of 300 mc. In addition, three keying tones, having frequencies of 150 kc., 170 kc., and 190 kc., and corresponding to responders 4, 5 and 6, respectively, are sequentially modulated on the interrogator carrier signal. Each responder identifies its corresponding keying tone in the received interrogator signal and acts, during its presence, to modulate the three, previously demodulated ranging signals, on an offset carrier signal of 260 mc. which is transmitted back to the interrogator station. In this way, the interrogator station is in sequential communication with the three responder stations and by demodulating the received responder carrier signals derives three ranging signals from each responder whose respective accumulative phase displacements with the original three reference ranging signals represents the slant range between the interrogator and the responder. Both the reference and the phase delayed ranging signals, received sequentially from the responders, are passed into the interrogator data station where slant range information to the three responders is derived.

In addition to the above operations, the 19 kc. and 613 kc. data signals received at the interrogator from each responder are each translated to the 599 c.p.s. frequency, and the resulting signals, along with the received 599 c.p.s. data signal are modulated on respective subcarrier signals which are then modulated on the interrogator carrier signal for telemetering to the ground. At the responder data station, the subcarrier signals are demodulated and the phases of these telemetered, data signals compared against the normally modulated 599 c.p.s. ranging signal. Since the telemetered and normal ranging signals for each responder undergo the same phase shift in traveling from the interrogator to the responder data station, a phase comparison between them, after demodulation, represents the slant range between the interrogator and the responder. Hence, sufficient information is available at the responder data station to compute the $x$, $y$ and $z$ coordinates of the interrogator station since the fixed coordinate positions of the three responders will normally be known.

Figure 2A:
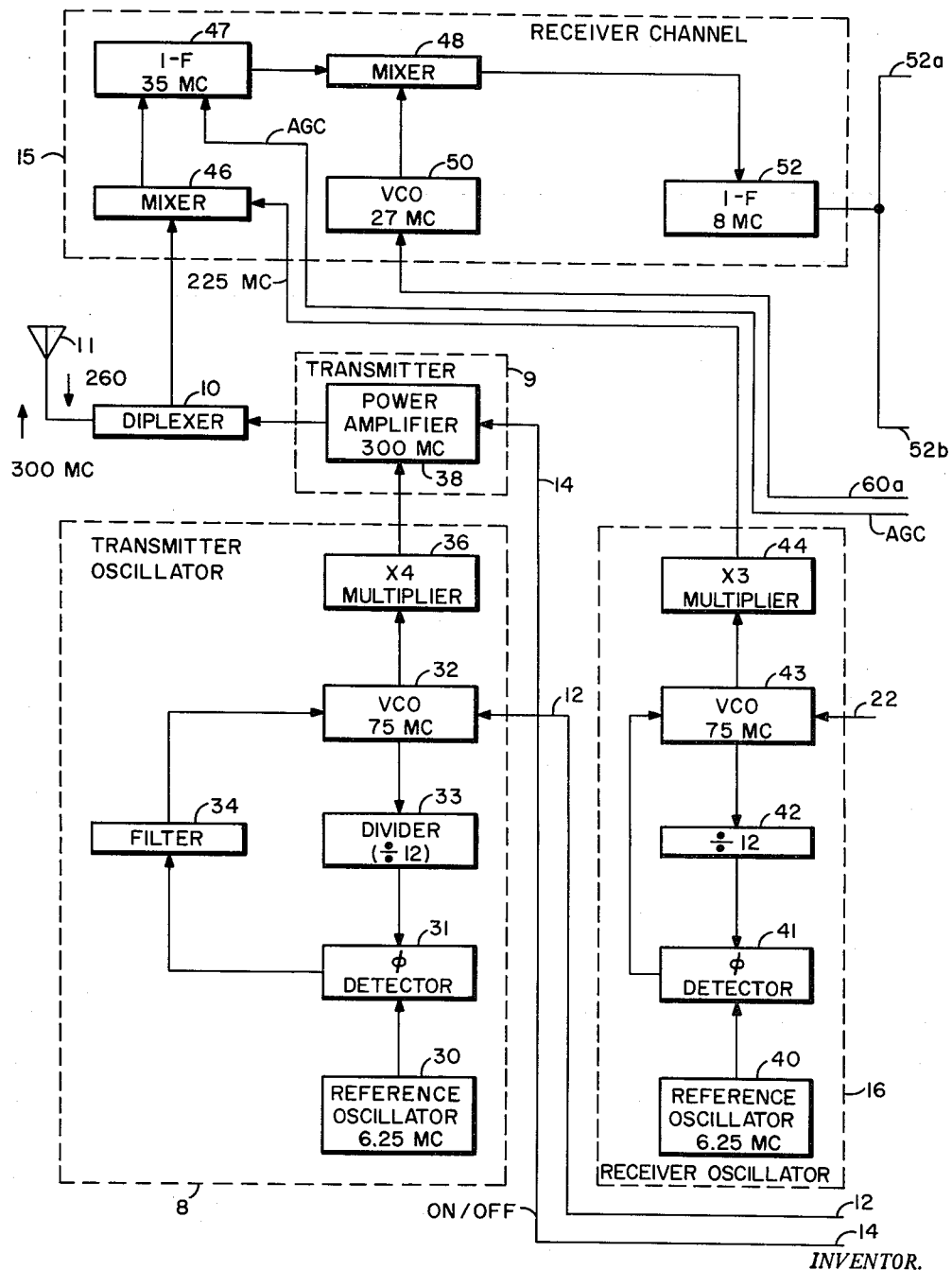
FIGURE 2 is a block diagrammatic representation of an interrogator unit.
Figure 2B:
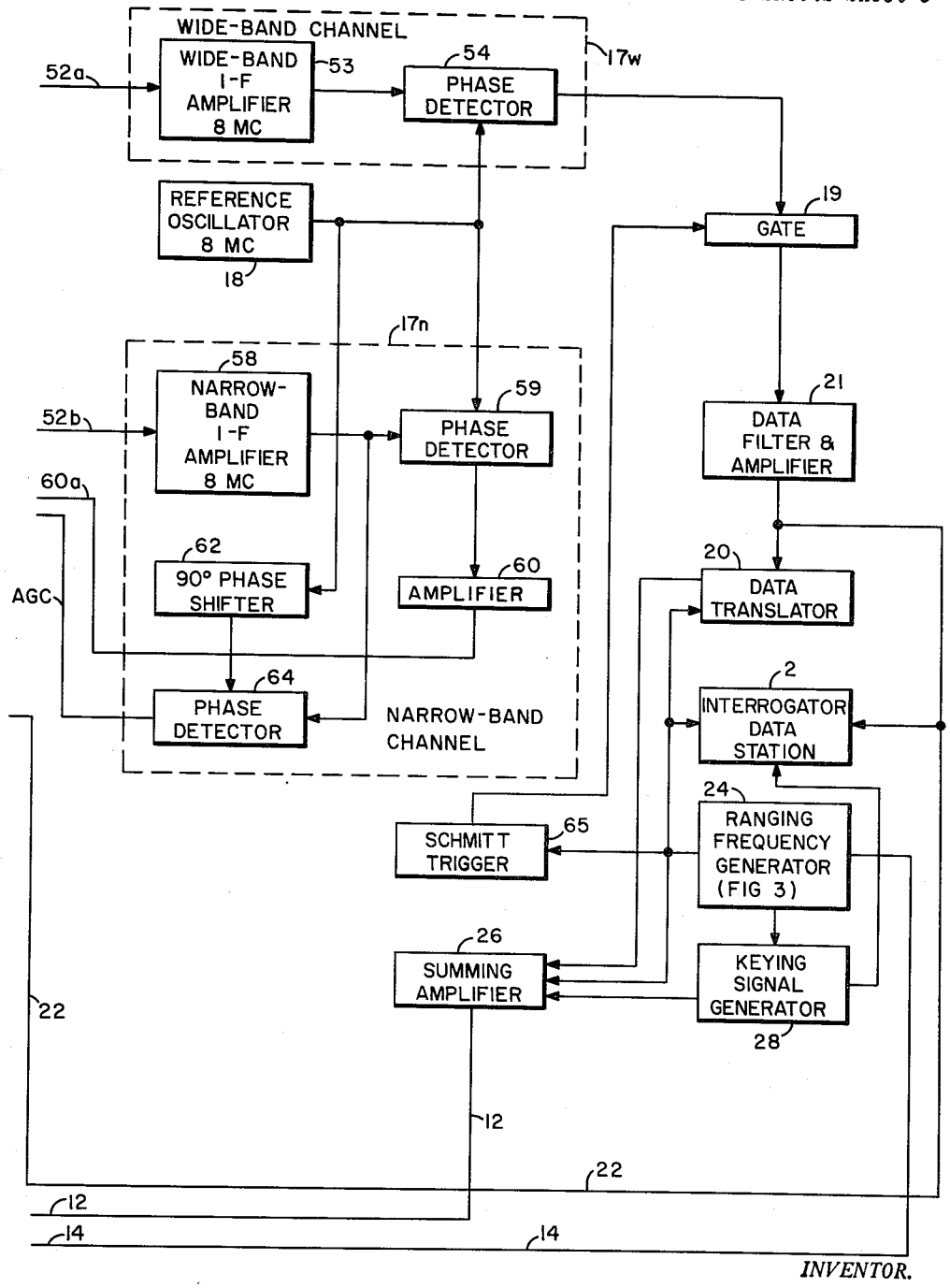

FIGURE 2 including FIGS. 2a and 2b illustrates the interrogator unit, some of the major systems being shown here in block diagrammatic form but which are later illustrated in more detail. Considering the major subsystems first of all, the output signal of a transmitter-oscillator 8, modulated by input signals appearing on an input conductor 12, is applied to a transmitter 9, controlled by an on/off switching signal on an input conductor 14. The output signal of transmitter 9 represents the output signal of this interrogator and is applied through a diplexer 10 to an antenna 11 for radiation.

The signal received on antenna 11 from the particular responder then transmitting is coupled through diplexer 10 to a receiver channel 15, which also receives the output signal of a receiver-oscillator 16. The output signal from channel 15 is applied both to the input terminal of a wide-band channel 17w and a narrow-band channel 17n. In addition, the output signal of an 8 megacycle reference oscillator 18 is applied to both the wide-band and narrow-band channels 17w, 17n. The narrow-band channel 17n produces an output automatic gain control or AGC signal which is applied to the receiver channel and a D.-C. signal serving to phase-lock one of its I.-F. signals to the reference oscillator 18 signal.

A gating signal originating in a ranging frequency generator 24 is applied to a Schmitt trigger 65 whose output signal is applied to the control terminal of a gate 19. The output signal of the wide-band channel 17w is applied to the data input terminal of the gate 19 whose output signal is applied to a data filter and amplifier 21 whose output signal is applied to a data translator 20, the interrogator data station 2 and to a conductor 22 carrying the demodulated ranging signals, which is connected to receiver-oscillator 16.

The ranging frequency generator 24 supplies the on/off signal to conductor 14 going to transmitter 9, the series of range reference signals which are applied to data translator 20, interrogator data station 2, and to a summing amplifier 26. In addition, ranging frequency generator 24 furnishes an output timing signal to a keying signal generator 28 whose output signal is also applied to summing amplifier 26. The output signal from data translator 20 is applied to a final input terminal of summing amplifier 26 whose output signal in turn, is conducted over conductor 12 to the modulating input terminal of transmitter oscillator 8.

Considering now the various subsystems if the interrogator unit in more detail, transmitter oscillator 8 includes a reference oscillator 30 producing an output signal of approximately 6.25 mc. which is applied to one input terminal of a phase detector 31. The output signal of voltage controlled oscillator or VCO 32, driven in a manner to be explained shortly to a nominal frequency of 75 mc., is divided 12 times in frequency by a divide-by-12 divider 33 and applied to the other input terminal of phase detector 31. The output signal from detector 31 is passed through a filter 34 to the control terminal of VCO 32. When the phase detector 31 output signal is zero, the phase and frequency of the VCO signal, after 12 times division by divider 33, exactly equals the reference oscillator signal frequency of 6.25 mc. and hence, is at 12 times 6.25 mc., or 75 mc.

Conductor 12, coming from summing amplifier 26, includes at any one time the three range reference signals, one of the three keying signals corresponding to the particular responder under interrogation, and subcarrier signals carrying the return data signals after frequency translation by data translator 20. These conductor 12 signals modulate the VCO signal and the resulting modulated signal, after frequency multiplication of four times by multiplier 36 to 300 mc. is passed to power amplifier 38. Amplifier 38 is normally "on" but is turned off, as explained in more detail later by the signal appearing on conductor 14, for approximately 1 millisecond during each complete interrogation cycle.

The receiver oscillator 16 includes a 6.25 mc. reference oscillator 40, a phase detector 41, a divide-by-12 divider 42, a VCO 43 and a multiplier 44, all connected identically to the similarly named circuits in transmitter-oscillator 8. The output signal frequency of VCO 43 is 75 mc., or 12 times the output frequency of oscillator 40 and the output signal frequency of multiplier 44 is 225 mc., or three times (3×) 75 mc.

It may be noted at this point that both the interrogator and responder units of the present system preferably employ relatively high modulation indices for the highest or 613 kc. ranging signal, on the order of 6 to 8. The basic accuracy of the system is determined by this signal, since it has the shortest wavelength. Accordingly, any phenomena adversely affecting the normal phase delay of this signal with distance traveled, affects the basic accuracy of the entire system. In particular, one factor, which has in the past limited the basic slant range measuring accuracy of slant range measuring equipment, has been multipath effects, in which transmitted signals are reflected from surrounding objects and enter the receiving antenna with various phase delays from the true or direct path signal. However, certain theoretical work has indicated that multipath effects may be substantially minimized by employing high modulation indices, particularly for the highest modulation signal which represents the basic system accuracy. Theoretical discussions of this subject may be found in the articles "Frequency Modulation Propagation Characteristics," by M. G. Crosby, in the Proc. I.R.E. 24 (1936), pp. 898–913, and "Frequency Modulation Distortion Caused by Multipath Transmission," by M. S. Corrington, in the Proc. I.R.E. 33 (1945), pp. 878–891.

Such a high modulation index is achieved by amplifying the 613 kc. signal in data filter and amplifier 21 an amount related to the other signals and to the parameters of VCO 32 such that the stated modulation index is obtained, with full signal input from gate 19. The particular manner of accomplishing this is well known to those skilled in the art. The responder stations are arranged, as later described in detail, to also employ a high modulation index for this 613 kc. ranging signal.

The employment of such a high modulation index results in most of the transmitted signal energy being found in sideband form, rather than at the basic carrier frequency. Now, conductor 22 coming from the output of data filter and amplifier 21 contains the demodulated range signals returned from the actuated responder, and extracted in a manner to be shortly explained. By applying these demodulated range signals to the modulating signal terminal of VCO 43 within receiver oscillator 16, two important functions are accomplished. First of all, the resulting modulated signal, after frequency multiplication by multiplier 44, in being mixed with the incoming modulated carrier signal in mixer 46, accomplishes modulation wipe-off in which the modulation index of the received signal which may be 6 or higher, is reduced to say, .05. Accordingly, the bandwidth requirements of the following I.-F. amplifiers in this receiver section become quite moderate.

In addition, the basic technique employed for range determination is based on measuring the phase shift incurred in a signal in traveling between two points and is further predicated on the same signal undergoing negligible phase shifts within the internal electronic circuitry. Since the demodulated range signals are those fed back to and mixed with the incoming receiver signals, a heavy degenerative feedback loop is effected, with the resulting range signal phase shifts in the circuitry between the two points being held to a negligible amount.

Continuing now with the description of the system, the output signal from mixer 46 is passed through an I.-F. amplifier section 47 to one input terminal of a second mixer 48. The other input terminal of the second mixer 48 receives the output signal of a nominal 27 mc. voltage controlled oscillator, VCO 50, whose frequency and phase is determined by the output signal from a phase detector in narrow-band channel 17n, in a manner explained shortly. The output signal of the second mixer 48 is passed through another I.-F. amplifier 52 having an 8 mc. center frequency. The AGC or automatic gain control signal from the narrow-band channel is applied to the first I.-F. amplifier 47 to control its gain.

The output signal of the other I.-F. amplifier 52 constitutes the receiver channel 15 output and is applied to the input terminal of a wide-band I.-F. amplifier 53 within the previously noted wide-band I.-F. channel 17w. The output signal from amplifier 53 is applied to one input terminal of a phase detector 54, detector 54 receiving the 8 megacycle output signal of reference oscillator 18 as its other input signal. The output signal of detector 54 representing the wide-band channel output signal is applied to gate 19 as previously noted.

In operation, phase detector 54 demodulates the three ranging signals appearing originally modulated on the received responder carrier signal. These signals will be passed by gate 19 so long as it is reopened by the gating signal coming from the ranging frequency generator 24. Data filter and amplifier 21 includes three narrow passband filters respectively tuned to the 599 c.p.s., 19 kc., and 613 kc. ranging signal frequencies, each followed by amplifiers.

The receiver channel 15 output signal is passed, within the narrow-band channel 17n, through a narrow-band I.-F. amplifier 58, center-tuned to 8 mc., to one input terminal of phase detector 59. The 8 mc. signal from reference oscillator 18 is applied to the other input terminal of phase detector 59 whose output signal in turn, is passed through a D.-C. amplifier 60 to the frequency control terminal of the 27 mc. VCO 50 within the receiver channel 15. This narrow-band channel connection acts as a servo loop to maintain the I.-F. channel carrier signal in frequency and phase-lock with the 8 mc. signal produced by reference oscillator 18. D.-C. amplifier 60 increases the servo loop gain by an appropriate factor, say 50 times, to pass the phase detector's D.-C. error signal and block modulation components back to VCO 50. By maintaining the I.-F. carrier signal at the reference oscillator frequency and phase, the ranging signal sidebands are maintained at their stated frequency and phase value with no subsequent loss of accuracy in their phase information.

During the initial portion of each responder sampling cycle, the ranging signals are not modulated on the interrogator carrier signal in order that the major portion of the transmitted signal energy will be concentrated at the carrier frequency. The appearance of full carrier signal strength in the narrow-band VCO loop enables the carrier signal phase lock-on in the receiver portion of the responder to be readily achieved as is needed for preserving slant range measuring accuracy, as noted above. This is true since the responder employs wide and narrow-band channels in its receiver, as later shown in FIGURE 8, which are similar to those here shown for the interrogator. Then the magnitudes of the range signals applied to the modulating terminal in the transmitter oscillator of the interrogator are increased linearly to a maximum value at which time, due to the high modulation index employed, the carrier signal strength drops to a small fraction of its value at the beginning of the cycle. However, since carrier signal lock-on is achieved at the beginning of the cycle, it will remain in phase-lock condition during the remaining portion of the cycle since the modulation wipe-off, effected by the feedback loop, maintains most of the carrier signal energy concentrated at the carrier signal frequency.

Since the responder remodulates its own transmitted carrier with ranging signal magnitudes corresponding to those received from the interrogator, the operation of this interrogator will be similar to that described for the responder since the received signal modulation profile in time will be similar to that just described. The manner of linearly increasing the range signal modulation at the beginning of each interrogation cycle and its subsequent linear decay at the end of each cycle is discussed later in connection with ranging frequency generator 24.

Returning now to the remaining details of narrow-band channel 17n, the reference signal from oscillator 18 is passed through a 90° phase shifting network 62 and applied to one input terminal of phase detector 64. The I.-F. signal output from the narrow-band I.-F. amplifier 58 is applied to the other input terminal of phase shifter 64 whose output signal, in turn, is applied back as an AGC signal to I.-F. amplifier 47 in the receiver channel 15.

Whenever the carrier signal is present and is phase-locked with the VCO output signal, the output signal from phase detector 64 will be at a maximum value owing to the 90° phase shift afforded the oscillator 18 reference signal. This signal is applied as an automatic gain control signal to I.-F. amplifier 47 in a manner to reduce its gain. Phase detector 64 operates in a reasonably linear manner over the range of I.-F. signal strength as discussed, that is, between maximum signal and no signal, and controls the sensitivity of the receiver channel accordingly.

Schmitt trigger 65 is actuated by one of the gating signals from ranging frequency generator 24 to open the feedback loop input to the receiver-oscillator between each ranging frequency pulse, i.e., three times in each interrogation cycle as will be described in more detail later. This operation acts to promote overall receiver stability.

The detailed operations of the remaining major subsystems, i.e., gate 19, data translator 20, interrogator data station 2, ranging frequency generator 24, keying signal generator 28 and summing amplifier 26 are fully described in connection with subsequent FIGURES 3 through 7.

Figure 3:
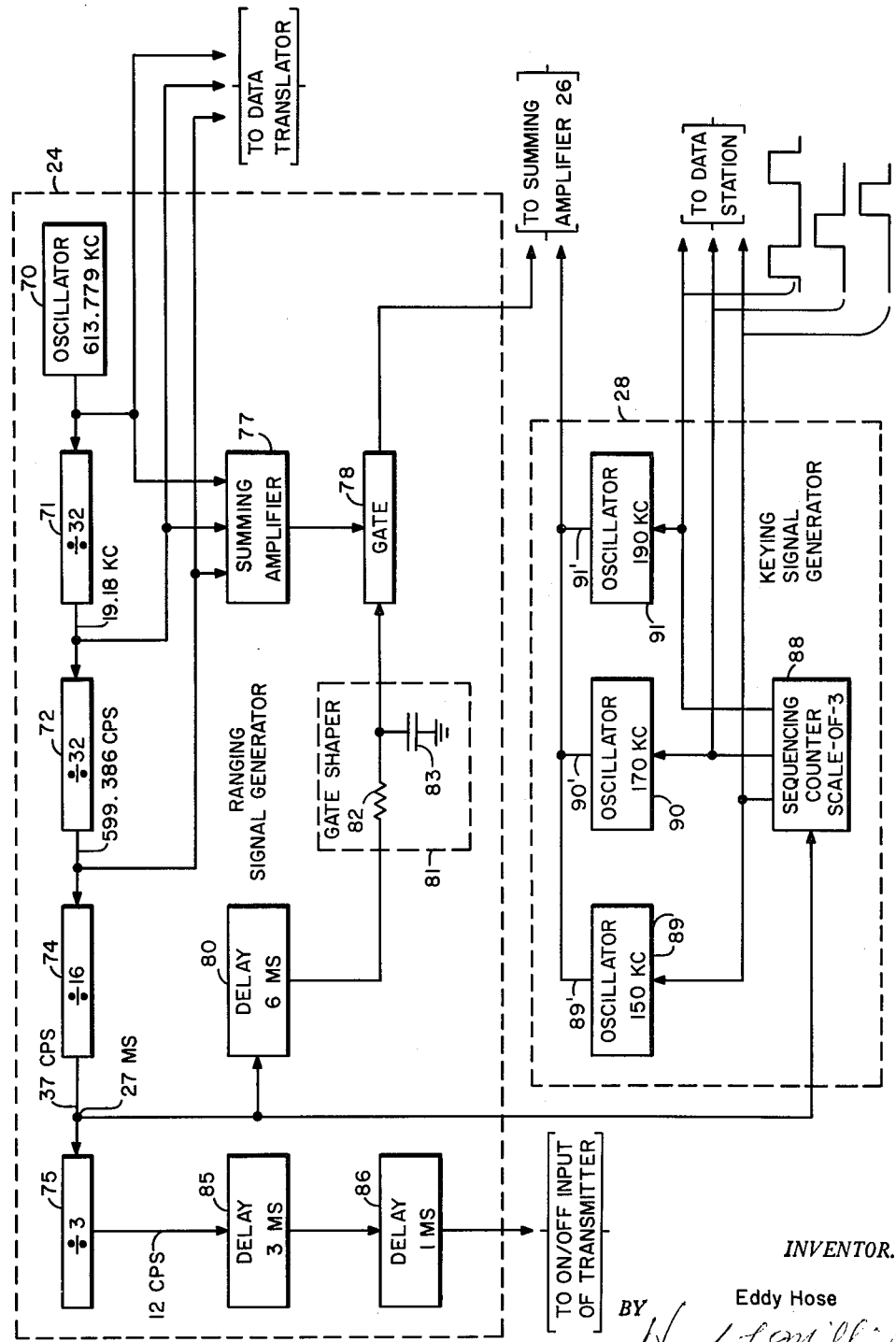
FIGURE 3 is a block diagrammatic representation of the ranging signal generator and the keying signal generator.

FIGURE 3 illustrates in block diagrammatic detail the ranging signal generator 24 and keying signal generator 28, both previously shown in subsystem form in FIGURE 2. In particular, the ranging generator includes an oscillator 70 producing the fine channel reference signal of exactly 613.779 kc. in frequency, but designated 613 kc. previously for purposes of simplicity. This signal is successively divided down by a divide-by-32 divider 71, a divide-by-32 divider 72, a divide-by-16 divider 74, and a divide-by-3 divider 75. The output signals from dividers 71 and 72 are of 19.18 kc. and 599.386 c.p.s. in frequency, respectively, designated 19 kc. and 599 c.p.s. for purposes of simplicity, and form the intermediate and coarse channel reference signals, respectively. These last two signals, along with the fine channel signal are taken, as indicated, to the data translator as previously shown in FIGURE 2. In addition, these three signals are also applied to a summing amplifier 77 whose output signal is applied to the signal input terminal of a gate 78.

The output signal of divide-by-16 divider 74, approximately 37 c.p.s. in frequency, is applied to a 6 millisecond monostable delay circuit 80 which responds to each cycle in the divider 74 output signal to produce a relatively low voltage output signal level lasting for 6 ms. This output signal is passed through a gate shaper 81 which includes a series resistor 82 shunted to ground by a capacitor 83. The output signal of shaper 81, taken across capacitor 83, is applied to the control input terminal of gate 78. The output signal of this gate represents the output signal of the ranging signal generator 24 and is applied to summing amplifier 26 of FIGURE 1.

The output signal from divider 75, having a frequency of approximately 12 c.p.s., is applied to the input terminal of a 3 ms. delay circuit 85 whose output signal, in turn, is employed to trigger a 1 ms. delay circuit 86. The output signal of delay circuit 86 is applied to the on/off input terminal of the FIGURE 2 interrogator power amplifier 38 in the transmitter unit 9.

The divide-by-16 divider 74 output signal is additionally applied to a scale-of-3 sequencing counter 88 within keying signal generator 28. Counter 88 includes three output terminals which are sequentially energized in accordance with its particular count. The first output terminal, when energized, operates a 150 kc. oscillator 89, the second and third terminals, when energized, respectively operate associated 170 kc. and 190 kc. oscillators 90 and 91. The output signals from these three oscillators 89, 90 and 91 are connected together and go to one input terminal of summing amplifier 26, shown earlier in the FIGURE 2 interrogator.

Figure 4:
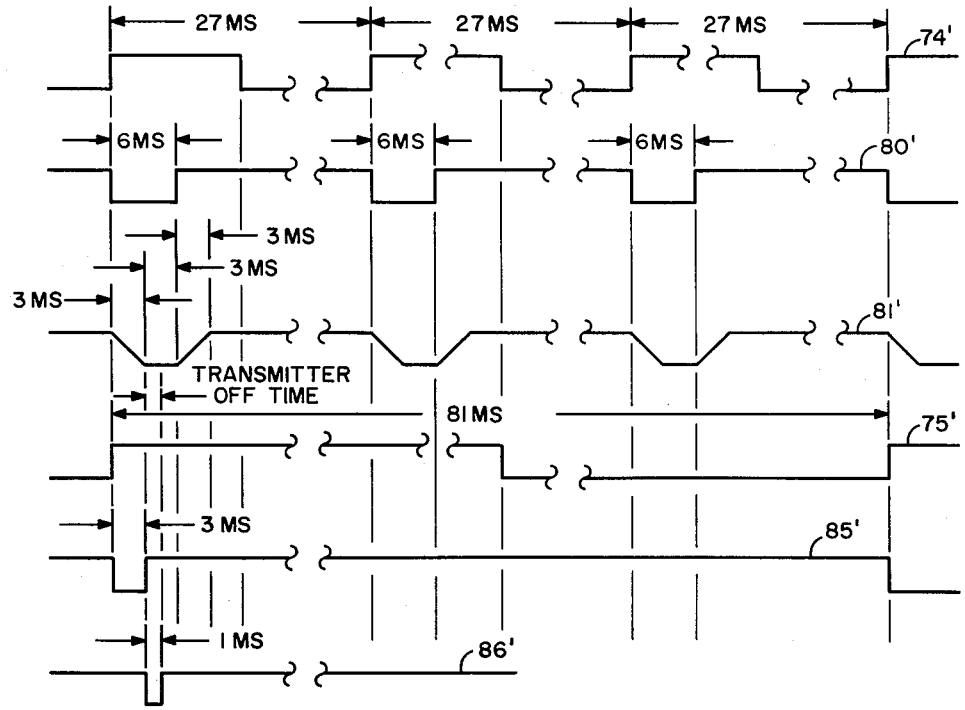
FIGURE 4 is a group of illustrative waveforms illustrating the operation of a portion of the FIGURE 3 circuitry.

FIGURE 4 shows a group of illustrative waveforms of various signals appearing in the FIGURE 3 circuitry and are employed to more fully explain the operation of the ranging signal generator. The output signal of divider 74, whose frequency is approximately 37 cycles per second, and is illustrated as waveform 74′ in FIGURE 4, represents the basic sequencing rate and is counted by sequencing counter 88 to thereby cause the three responders successively activated for interrogation purposes. Waveform 74′ is of squarewave configuration, each cycle lasting for 27 ms. This means, then, that each responder is sampled slightly over 12 times per second. If additional responders were employed, then the rate of interrogation of each would be appropriately lowered based on the 37 c.p.s. frequency, assuming scale-of-3 counter 88 were modified to count in a scale corresponding to the particular number of responders employed.

Multivibrator 80 is triggered at the beginning of each signal 74′ cycle and its output signal is shown by waveform 80′ in which its normal relatively high voltage level goes to a relatively low value for the 6 ms. interval. Signal waveform 81′ represents the output signal of gate shaper 81 which is the signal applied to gate 78 to control the relative output amplitudes of the three ranging signals, before their application to the modulating input terminal of the transmitter. Resistor 81 and capacitor 83 have a time constant somewhat longer than the modulation build-up time of 3 ms. with the result that the resulting charging curve waveform is substantially linear. Thus, the ranging signals appearing at the output of gate 78 are linearly decreased in amplitude following the triggering of delay circuit 80 for 3 ms., are blocked by the gate for another 3 ms., and then linearly increased for a 3 ms. interval following the end of the delay circuit 80 6 ms. delay interval. The reasons governing this circuit action requirement were previously given in connection with the FIGURE 2 interrogator.

Divider 75 in dividing down the 37 c.p.s signal of divider 74, produces a squarewave signal whose period corresponds to one complete interrogation cycle, that is, one in which all three responders are consecutively interrogated. Its output waveform is indicated at 75′ in FIGURE 4. The 3 ms. delay produced by the positive going leading edge of signal 75′ in the output signal of delay circuit 85 is indicated in its signal 85′. When signal 85′ returns to its normal high voltage state, 1 ms. delay circuit 86 is triggered as is indicated by its associated signal waveform 86′. The resulting 1 ms. relatively low voltage level in signal 86′ appears just following the time gating signal 81′ reaches complete cutoff following the 3 ms. linear decay time in the gate shaper signal. Signal 86′ is applied to the on/off terminal of the interrogator transmitter, as shown earlier in FIGURE 2, the interrogator transmission is completely cut off for the duration of its 1 ms. interval. This cut off period is accordingly produced once each complete interrogation cycle and is employed to prevent or halt any oscillations which may have started to build up in any of the responder receiver circuits. This oscillation may occur since all receivers continuously receive the interrogator transmitted signal and include phase-lock and data signal feedback loops and may, with time, undergo phase changes, etc., which lead to regenerative, rather than degenerative, action. By eliminating the interrogator transmitted, and hence responder received, energy for this 1 ms. interval, any incipient oscillations are permitted to die out.

Signal 81' is the one generated within ranging frequency generator 24 which is applied to the control terminal of Schmitt trigger 65 in the narrow-band channel. The Schmitt trigger is preferably adjusted to trigger and block gate 19 during the 3 millisecond off time of waveform 81'. This action is desirable in that during the off time, only noise appears at the data input terminal of gate 19 which would act adversely on the crystal filters, preferably employed in the data filter and amplifier 21. Thus, whenever the data signals are again modulated on the carrier signal Schmitt trigger 65 returns to its normal off condition and gate 19 again passes the data signals.

FIGURE 5 shows the data translator 20 of FIGURE 2 in more detail. In particular, the 613 kc. reference signal is supplied to one input terminal of a mixer 100, the other input terminal of mixer 100 receiving the output signal of a voltage controlled oscillator, VCO 102. The 599 c.p.s. reference signal and the output signal from mixer 100 are applied to the respective two input terminals of a phase detector 103 whose output signal, in turn, controls the frequency of VCO 102. The output signal of VCO 102 and the data signals coming from data filter and amplifier 21 of FIGURE 2 are applied to the two input terminals of a mixer 105. The output signal of mixer 105 is passed through a 600 cycle filter 106 to the control terminal of a 70 kc. subcarrier oscillator 107. The output signal from oscillator 107 is applied to one input terminal of a summing amplifier 110.

The 613 kc. and the 19 kc. reference signals are applied to a mixer 112 whose output signal is passed through a divide 32 divider chain into a mixer 116. The output signal from data filter and amplifier 21, is applied to the other input terminal of mixer 116, with the output signal from mixer 116 being passed through another 600 cycle filter 118 to the control terminal of a 50 kc. subcarrier oscillator 119, whose output signal, in turn, is also applied to summing amplifier 110.

The data signals are also applied to another 600 cycle filter 122 whose output signal is applied to a 30 kc. subcarrier oscillator 124. The output signal of oscillator 124 is applied to another input terminal of summing amplifier 110. An external information source 128 is indicated which includes a resolver 140 having a shaft 141, indicated by the dotted line. The 599 c.p.s. reference signal is passed through the resolver to the input terminal of a 130 kc. subcarrier oscillator 130 whose output signal, in turn, is applied to a final input terminal of summing amplifier 110. It will be noted that the output conductors from filters 106, 118 and 122 are designated 106', 118', 122', respectively.

The purpose of the data translator unit is two-fold. First of all, the fine and intermediate channel data range signals, returned from the responders and appearing as the receiver output signals, are converted to the coarse channel frequency of 599.39 c.p.s., without loss of the phase information. These signals are then routed to the data station for slant range determination purposes. Secondly, the translated data signals are employed to modulate separate subcarrier signals which are then, in turn, modulated on the interrogator carrier signal for telemetering back to the ground data station.

Considering the translation of the fine channel frequency, examination of the operation of mixer 100, VCO 102, and phase detector 103 indicates that VCO 102 is driven such that its output signal frequency 613.180 kc., or exactly 599.39 c.p.s. lower than the fine channel reference signal of 613.779 kc. Any deviations from this stated VCO 102 output signal results in an error signal produced by the phase detector 103 which acts to drive the VCO such that its frequency is at the stated value. This 613.180 kc. VCO signal, in being mixed within mixer 105, with the 613.779 kc. data signal produces a data signal of 599.39 kc. which is passed by 600 cycle filter 106 to oscillator 107. The phase relationship between this latter signal and the 599.39 reference signal corresponds exactly to the phase between the 613 kc. data and reference signals corresponds exactly to the phase between the 613 kc. data and reference signals. Hence, the fine channel phase information is transferred to this translated signal. Finally, this translated fine channel signal is passed to the data station as the fine channel data signal and, additionally, is modulated on the 70 kc. signal produced by subcarrier oscillator 107 to thereby form the telemetered fine channel data signal.

The output of mixer 112 is the sum of its two input frequencies, or 632.959 kc. This signal after division by 32 in divider chain 114 results in a frequency of 19.779 kc. This signal, in turn, is passed to mixer 116 and the difference signal between this and the intermediate data signal produces a 599.39 c.p.s. data signal frequency. Phase information is preserved for the same reasons indicated previously. This intermediate channel translated signal is modulated on the 50 kc. signal produced by oscillator 119, for telemetering to the ground. No frequency translation is required for the 599 c.p.s. data signal and it is, after passing the 600 cycle filter 122, directly modulated on the 30 kc. output signal of subcarrier oscillator 124 for telemetering to the ground.

The phase of the 599 c.p.s. reference signal is displaced in passing through resolver 140 an amount based on the displacement of the resolver input shift 141. The resulting signal is then modulated on the 130 kc. output signal of subcarrier oscillator 130 and then telemetered to the ground in the same way described for the data signals. Shift 141 of resolver 140 may be coupled to and driven by any one of a number of instruments such as altimeters, pressure transducers, temperature transducers, air speed indicators and the like. In this way, additional information, other than slant range information, may be transmitted from the moving station to the ground data station and there received in a manner later explained. It will be apparent that additional external information channels, similar to 128, may be employed in the system for transmission of additional information other than slant range.

Figure 6:
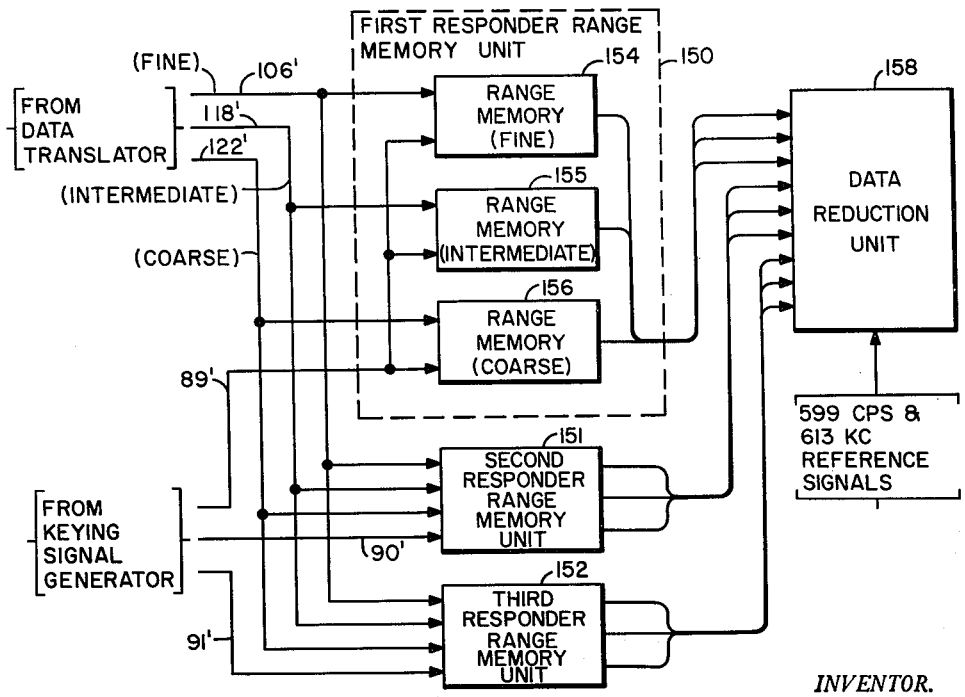
FIGURE 6 is a block diagrammatic representation of a typical interrogator data station.

FIGURE 6 illustrates a typical interrogator data station. This station includes range memory unit 150 associated with the first responder, not specifically illustrated, second and third responder range memory units, 151 and 152, associated with the second and third responders, respectively. Unit 150, typical of the three, is shown in slightly more detail and includes a fine channel memory 154, an intermediate range memory 155 and a coarse range memormy 156. A typical range memory is shown detailed in the following FIGURE 7 and its operation described in connection therewith. Conductor 106', from the FIGURE 5 data translator, and carrying the translated fine channel data signal, is coupled to fine range memory 154 within range memory unit 150 and is likewise applied to corresponding fine channel range memories, not specifically shown, in the remaining two memory units 151 and 152. The translated intermediate channel data signal, appearing on line 118' from the data translator, is applied to the intermediate range memory 155 and to corresponding range memories, not specifically illustrated, in units 151 and 152. The coarse channel data signal, appearing on conductor 122' from FIGURE 5, is applied to range memory 156 within unit 150 and to corresponding range memories, not illustrated, within units 151 and 152. Finally, the output signals of unit 150 and represented by the respective output signals of the range memories 154, 155 and 156 are taken to a data reduction unit 158. The 599 c.p.s. and 613 kc. reference signals produced originally by the ranging signal generator of FIGURES 2 and 3, are also applied to unit 158.

Conductor 89', coming from 150 kc. oscillator 89 in the keying signal generator previously shown in FIGURE 3, is coupled to each of the range memories in range memory unit 150. In the same way, output conductor 90' of the 170 kc. oscillator 90 in the keying signal generator is coupled to range memory unit 151 and output conductor 91' of 190 kc. oscillator 91 is coupled to range memory unit 152. Finally, the three output signal conductors, not individually shown, from each of the second and third responder range memory units 151 and 152 are also connected to the data unit 158.

Although the range memory is shown detailed in FIGURE 7 and described in connection therewith, it may be here stated for the purpose of explaining the broad operation of this FIGURE 6 interrogator data station that each range memory includes a voltage controlled oscillator driven by an operational amplifier to be phase-locked with its associated data signal during the time of appearance of its associated data signal. Then, during the data signal "off" time, that is, when either of the two remaining responders are being interrogated, the data signal input to the amplifier is effectively removed and an associated filter in the amplifier's feedback circuit acts to hold the VCO's previous frequency and phase, with the result that the VCO signal is maintained at the frequency and phase determined during the previous sample. With this accomplished, the range memory VCO output signal phase can be compared any time with the reference signal for slant range determination.

Figure 10:
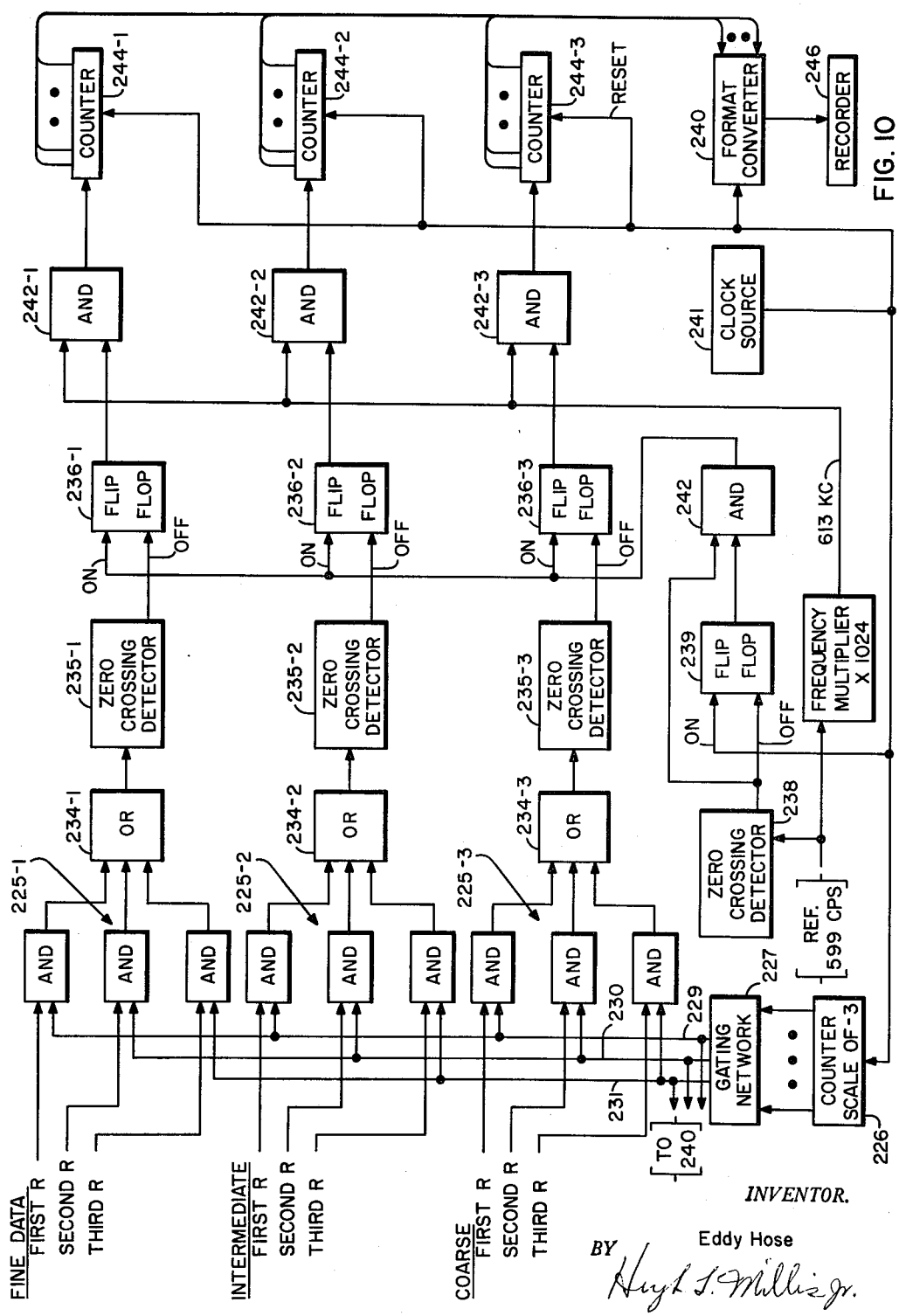
FIGURE 10 is a block diagrammatic representation of a typical data reduction unit.

By employing this technique, it is possible to separate responder interrogations and the data samplings, that is, the two functions may be independently performed since the range memory carries the data phase information between data input times. Accordingly, determination of slant ranges by employment of phase measuring techniques, one embodiment being later shown in FIGURE 10, is not specifically limited to particular responder sample times, but may be performed at any time, and as often as is required, for the particular system's operation.

Returning now to FIGURE 6, the appearance of each keying signal serves to gate the range memories in its associated responder range memory unit to an "on" or operating condition in which internal VCO's are driven to exact phase-lock with the data signals coming from the data translator. Then, during the absence of a keying signal, the range memory essentially maintains or "remembers" the previous VCO phase-locked condition. Additional details of data reduction unit 158 are found later in FIGURE 10 and described in connection therewith. The conductors coupled to unit 158 from the various range memory units 150, 151, and 152, as will be understood from the following FIGURE 7 description, comprise the basic output phase-locked VCO signals. Each signal will hence be at the 599 c.p.s. frequency and have a phase relationship with the coarse channel reference signal which represents the slant range information of its particular channel.

Figure 7:
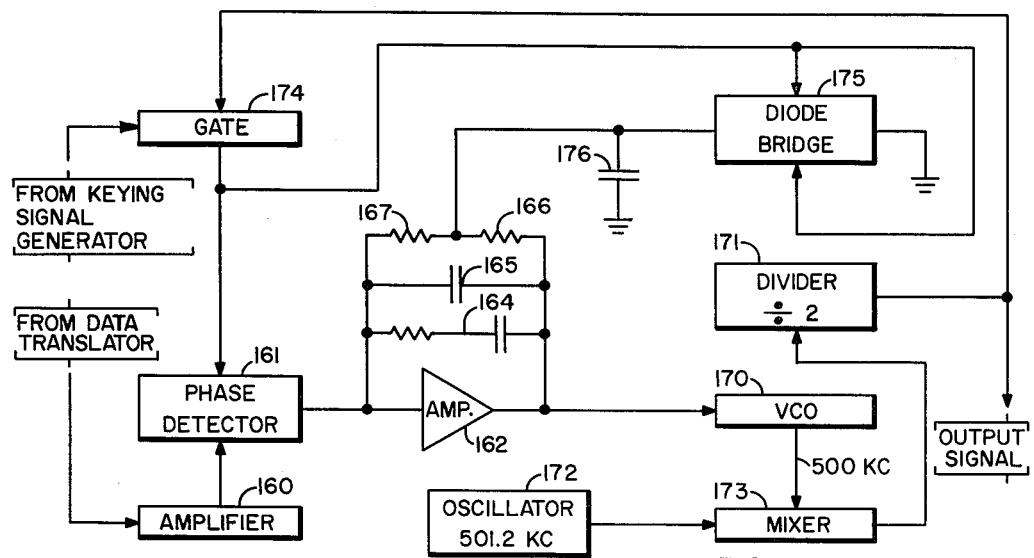
FIGURE 7 shows a typical range memory unit in partly block diagrammatic and partly schematic form.

A range memory is shown in block diagram form in FIGURE 7 and may be taken as representative of any of the range memories previously shown in the FIGURE 6 range memory units. In particular, one of the data lines, for example 106', 118' or 122' coming from the data translator unit and carrying an associated 599 c.p.s. data signal is amplified by an amplifier 160 and passed to one input terminal of a phase detector 161 whose output signal is applied to the input terminal of a D.-C. amplifier 162.

Amplifier 162 includes a resistor-capacitor circuit 164, a capacitor 165 and a pair of serially connected resistors 166 and 167, connected between its output and input terminals in parallel to each other to constitute a feedback network. The output signal from amplifier 162 is applied to a voltage controlled oscillator, VCO 170, whose output signal of 500 kc. is mixed within a mixer 173 with the output signal of an oscillator 172, producing an output signal frequency of 501.2 kc. The resulting difference frequency of 1200 c.p.s. is divided by a divide-by-two divider 171.

The output signal of divider 171 constitutes the range memory output signal and is additionally applied to the data input terminal of a gate 174 within the range memory. One of the output signal conductors, for example 89', 90' or 91' from the keying signal generator, not again illustrated, is coupled to the control input terminal of gate 174, the gate output signal being applied to the other input terminal of phase detector 161.

The gate 174 output signal is also applied to the pair of control input terminals of diode bridge 175 whose pair of signal conductors are respectively coupled to ground and to the junction point between serially connected resistors 166 and 167 in the feedback network associated with amplifier 162. Finally, a capacitor 176 is coupled between this common resistor point and ground.

The operation of the range memory circuit falls into two distinct cycles or phases, i.e., (1) the "on" time, that is during the time that a keying signal occurs denoting that its associated data signal is appearing on its input line from the data translator, and (2) the "off" time, that is, when no corresponding keying signal appears denoting that its associated signal is not then appearing. Considering first of all an "on" cycle, gate 174 is opened by the keying signal to pass the output signal of the memory unit, coming from divider 171, to both phase detector 161 and diode bridge 175. Any phase difference between this range memory output signal and the input data signal will appear as D.-C. error signal at the output of phase detector 161 and be applied to amplifier 162.

Since gate 174 is open, the 599 c.p.s. range memory output signal, in being coupled across diode bridge 175 serves to open the signal terminals of bridge 175 for one-half of each of its cycles. On the other hand, bridge 175 acts to effectively short the capacitor associated input terminal to ground during the other half cycle in each of the range memory output signal cycles. Accordingly, capacitor 176 is substantially discharged to ground potential during each of these shorting half cycles. By relating the values of resistors 166 and 167 with the value of capacitor 176 to have an overall time constant of, say, 10 seconds, as is provided by a resistor of 10 megohms and a capacitor of one microfarad, the capacitor is not appreciably charged above ground during the other or open-circuited bridge half cycle.

Accordingly, the common junction between resistors 166 and 167 is effectively shorted to ground, and under this condition, the input and output terminals of amplifier 162 are both coupled to ground through resistors 167 and 166, respectively, with the result that only minor feedback exists around the amplifier. Hence, the amplifier's resulting high gain is effective in driving VCO 170 back through the phase detector 171 loop to be in phase-lock with the incoming data signal. Additionally, during the "on" or phase-locking period, capacitors 165 and 164 are given respective charges which correspond to both the phase of the data signal and the rate of change of phase of the data signal. These charges then act, during the subsequent "off" intervals, to both drive the VCO at the previously established phase, and rate of change of phase of the incoming data signal. Hence the phase of the output signal is actually changed during the "off" intervals owing to this phase change or velocity component. Therefore, its phase will correspond in phase with the data signal at any instant during the "off" interval for an interrogator moving without significant acceleration.

Now, during the "off" portion of each cycle, gate 174 is inhibited and no output signal is fed back to phase detector 161 and diode bridge 175. Under these conditions, no phase detector output signal is produced and amplifier 162 is driven entirely in accordance with the charges previously stored on capacitors 164 and 165. Also, bridge 175 will be open circuited, and no longer short capacitor 176 to ground in alternate half cycles of the output signal as it did during the range memory "on" time. Accordingly, capacitor 176 is exponentially charged through resistors 166 and 167 with the result that a feedback path exists between the amplifier output and input terminals. The feedback signal includes the previous charges stored on capacitors 164 and 165 which serve to drive VCO 170 according to the last phase and change of phase condition of the "on" cycle. The exponential increase of feedback around amplifier 162 due to the charge build-up across the capacitor 176 acts to stabilize the action of D.-C. amplifier 162 by minimizing drift.

Figure 8:
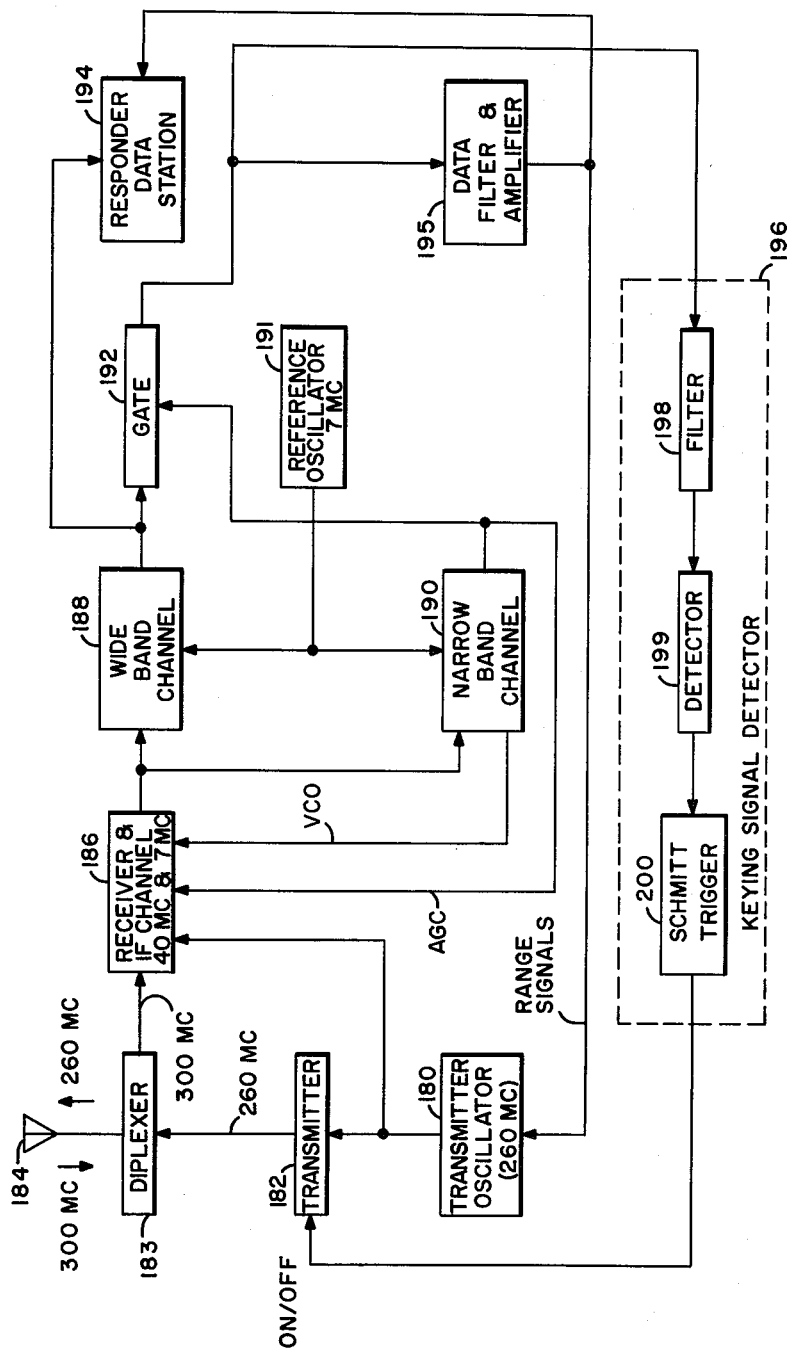
FIGURE 8 is a block diagrammatic representation of a typical responder station.

FIGURE 8 shows a typical responder station in block diagrammatic form similar to the interrogator station of FIGURE 2. The 260 mc. output signal of a transmitter-oscillator 180, corresponding to transmitter-oscillator 8 of the interrogator, is applied to a transmitter 182, corresponding to transmitter 9 of the interrogator. The transmitter output signal is coupled through a diplexer 183 to an antenna 184 for external radiation.

The 300 mc. carrier signal received from the interrogator is coupled by diplexer into a receiver channel 186, corresponding to receiver channel 15 of the interrogator. The output signal of transmitter-oscillator 180 is also applied to receiver channel 186 and is employed in place of the receiver-oscillator 16 signal in the interrogator unit. The receiver channel contains, not specifically shown, first and second I.-F. sections of 40 mc. and 7 mc. center frequencies, respectively, which correspond to the 35 mc. and 8 mc. I.-F. frequencies, respectively, in the interrogator receiver channel. The output signal from receiver channel 186 is applied to the input terminals of wide-band and narrow-band channels 188 and 190, corresponding to the same designated channels 17w and 17n, respectively, of the FIGURE 2 interrogator. The 7 mc. output signal of a reference oscillator 191, corresponding to oscillator 18 in the interrogator, is applied to each of the wide-band and narrow-band channels 188 and 190. The output signal from wide-band channel 188 is applied both to a gate 192, corresponding to gate 19 of the interrogator, and to a responder data station 194, shown in more detail in the following FIGURE 9 and described in connection therewith. The control input terminal of gate 192 receives the same signal as is fed back to the receiver as AGC. During the 1 ms. carrier-off period discussed previously in connection with FIGURE 2, the AGC output of 190 rises owing to the loss of carrier and triggers gate 192, closing it. In addition to the AGC a VCO signal is taken from channel 190 and applied to receiver channel 186, both signals corresponding to the identically designated signals in FIGURE 2.

The output signal from gate 192 is applied to a data filter and amplifier 195 corresponding to data filter and amplifier 21 in FIGURE 2 and to the input terminal of a filter 198 within a keying signal detector 196. The output signal from data filter and amplifier 195 is applied both to the responder data station 194 and to the modulating input terminal of transmitter-oscillator 180.

Keying signal detector 196 additionally includes a detector 199 receiving the output signal of filter 198. The output signal of detector 199 is employed to trigger a Schmitt trigger 200 whose output signal, in turn, controls the transmission from transmitter 182.

The operation of the typical FIGURE 8 responder station is similar in most respects to the FIGURE 2 interrogator station. The carrier signal received from the interrogator is 300 mc. while its own transmitted carrier signal is 260 mc. in frequency. The received interrogator signal is modulated by the three ranging signals, each delayed in phase from its corresponding interrogator generated reference signal an amount based on the slant range between the interrogator and the receiving responder. In addition, the interrogator carrier signal is always modulated by one of the three keying signals, and a series of telemetered signals including the actuated responder's returned data signals, the reference signal, and the external information signal. The 260 mc. output signal from oscillator 180 is mixed with the incoming 300 mc. carrier signal within the receiver channel and since this 260 mc. signal is modulated by the received data signals extracted in the wide-band channel, modulation wipe-off and degenerative feedback, previously described as occurring in the interrogator, is also accomplished here. The narrow-band channel 190 is similar to the one described in FIGURE 2 and the VCO signal applied to receiver channel 186 from channel 190 maintains the final receiver 7 mc. I.-F. amplifier, not again illustrated, in signal phase-locked with the output signal of reference oscillator 191. In addition, the AGC signal produced in the narrow-band channel is applied to receiver channel 186 as previously described, and a gating signal is also produced whenever the carrier signal is present, the gating signal serving to open gate 192.

The telemetered signals appearing at the output of wide-band channel 188 are applied to a responder data station 194 and there operated on in a manner to be shown in the following FIGURE 9 and described in connection therewith. Data filter and amplifier 195 selectively filters and amplifies the three ranging signals which appear in the received interrogator signal and were detected in the wide-band channel. These resulting data signals are also applied to responder data station 194 and additionally employed to modulate the output of transmitter-oscillator 180, for transmission back to the interrogator unit.

In addition, the output signal from gate 192 is applied to a keying signal detector where filter 198 is tuned to the particular keying signal which corresponds to its own designation. Whenever this signal appears, denoting that the responder is to retransmit the received ranging signals, it is passed by filter 198, detected by detector 199, and triggers Schmitt trigger 200 to its "on" state. This signal, in turn, turns "on" transmitter 182 with the responder return signal being radiated from antenna 184 to the interrogator unit. Whenever this keying signal frequency disappears as it is replaced in the interrogator by another keying signal, and the output signal of detector 199 drops to zero, Schmitt trigger 200 returns to its normal "off" condition, and transmitter 182 goes to its "off" condition and terminates its transmission.

Figure 9:
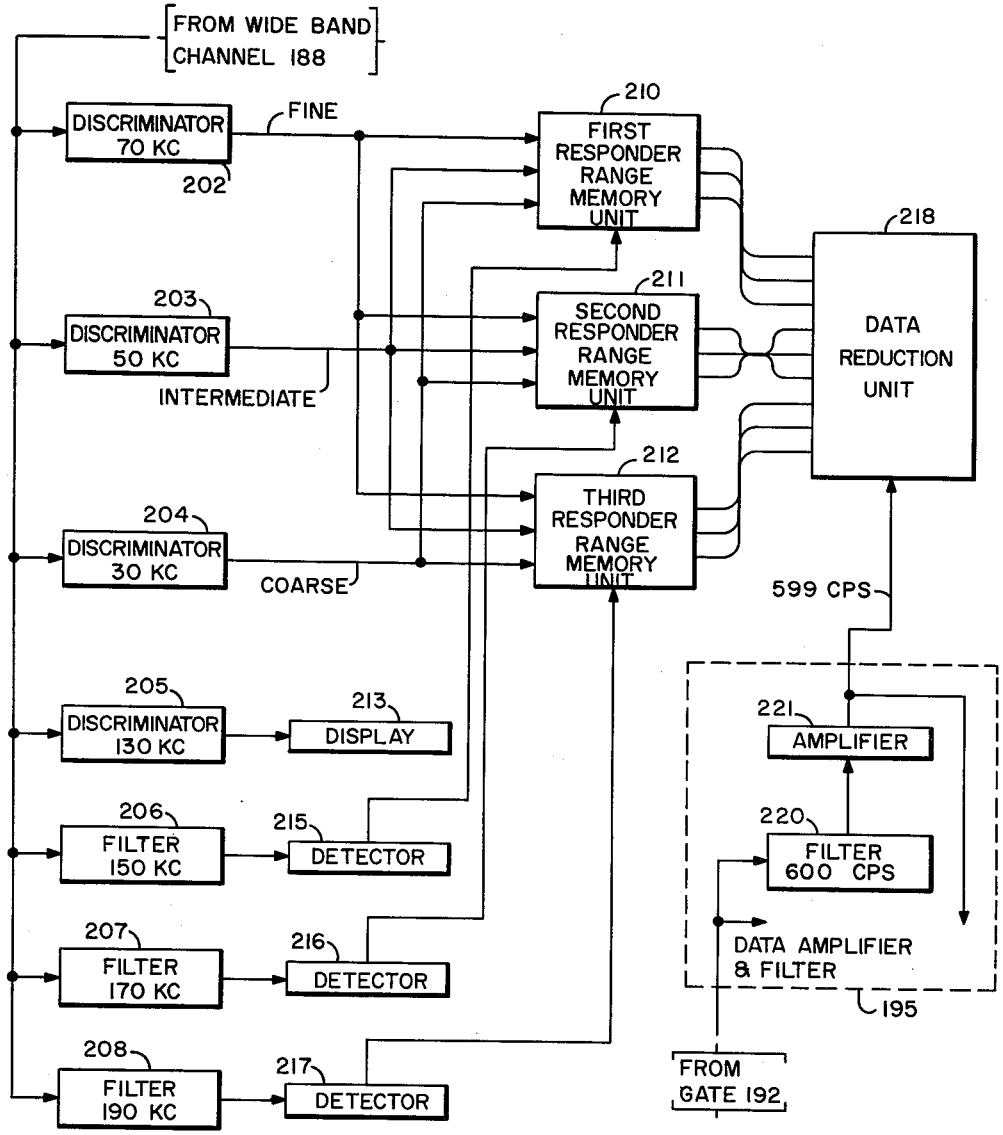
FIGURE 9 is a block diagrammatic representation of a typical responder data station.

FIGURE 9 shows a typical responder data station, previously shown at 194 in FIGURE 8, in more detail. The output signal from wide-band channel 188 is applied to the input terminals of a 70 kc. discriminator 202, a 50 kc. discriminator 203, a 30 kc. discriminator 204, a 130 kc. discriminator 205, a 150 kc. filter 206, a 170 kc. filter 207 and a 190 kc. filter 208. The output signals from discriminators 202, 203 and 204 are applied to respective input terminals in each of the first, second and third responder range memory units 210, 211, and 212, respectively. Each of these range memory units are similar to range memory unit 150 shown in FIGURE 6. The output signal of discriminator 205 is applied to a display unit 213. The output signals from filters 206, 207, and 208 are applied to detectors 215, 216 and 217, respectively, whose output signals, in turn, are applied to the control input terminals of range memory units 210, 211, and 212, respectively. The three output signals from each of the range memory units are applied to corresponding input terminals of data reduction unit 218. In addition, the output signal from gate 192 is applied to the input terminal of a 600 cycle filter 220, within the data amplifier and filter 195. The output signal of filter 220 is passed through an amplifier 221 to constitute the 599 c.p.s. effective reference signal applied to the data reduction unit 218.

The output signal from wide-band channel 188 includes the subcarrier telemetered ranging signals and the signal from the external information source. Discriminators 202, 203 and 204 serve to detect their associated subcarrier signals which represent the fine, transmitted and coarse data signals, respectively, from the interrogator unit.

The keying signals appear on the output terminal of the wide-band channel as bursts of AM modulation as they were detected earlier in the wide-band channel. Each of the filters 206, 207 and 208 acts to pass the keying signal of its own designated frequency and each of detectors 215, 216 and 217 produce corresponding output signals upon appearance of an input signal from its associated filter. Thus, for example, detector 215 passes a keying signal to the first responder range memory unit whenever a 150 kc. keying signal is present in the responder circuit denoting that the first responder is then in communication with interrogator unit. The only portion of the data amplifier and filter circuit 195 illustrated is that pertaining to the coarse channel frequency of 599 c.p.s. This signal and the other ranging signals appear demodulated in the wide-band channel output signal, and filter 220 serves to pass the coarse channel frequency which is then amplified by amplifier 221 and passed to the data reduction unit where it serves as a basic reference signal for the subsequent data reduction operation.

By way of review, assume that the responder data unit is associated with the third responder and that the slant range distance between the interrogator and first responder is to be determined. In operation, the three range signals produced in the interrogator are periodically transmitted to the first responder and returned. If the slant range distance between this first responder and the interrogator is denoted by $D_1$ then, the total distance traveled by the range signals, measured back at the interrogator unit, corresponds to $2D_1$. These signals, at their return, as will be recalled from the operation of the interrogator unit, are modulated on respective subcarrier signals for relaying purposes. Continuing this example, if the distance between the third responder and the interrogator is denoted by $D_3$ then, the total phase shift incurred in each of these telemetered or relayed signals will be $2D_1+D_3$. The original three range signals are also received at this third responder and these will experience a phase delay corresponding to the distance $D_3$.

If now, the coarse range signal received directly from the interrogator and which experienced a $D_3$ delay, is employed as a reference signal by comparing its phase to the telemetered range signals, then the $D_3$ distance between the third responder and the interrogator is cancelled out. That is $(2D_1+D_3)-D_3=2D_1$ and there has been recreated by this phase comparison technique a quantity in this third responder data station which represents twice the slant range between the interrogator and the first responder.

Since the same operation may be repeated for the second and third responders in the three range memory units, it is apparent that a single ground based data station acquires slant range information between the interrogator and each of the responder stations in the corresponding range memory units. From this data, knowing the responder station coordinates ground based computation may be performed to determine the interrogator location in $x$, $y$ and $z$ coordinates. Also, as pointed out previously, since range memories are employed, the samplings of their data may be made at any time, that is, independently of the interrogator-responder sampling intervals.

FIGURE 10 illustrates a typical data station and may be employed in the interrogator station of FIGURE 2 or responder of FIGURE 8 since the data applied to it in both cases are identical in form. The incoming data signals are grouped into the fine data lines for all three responders, intermediate data lines and finally the coarse data lines. In particular, the fine data lines corresponding to the three responders are applied to respective input terminals of a set of three "and" gating circuits, generally designated 225–1. In the same way the three responder intermediate channel conductors are coupled to respective input terminals of three respective "and" gating circuits, generally designated 225–2, and those representing the coarse information to three "and" gating circuits shown generally at 225–3.

The output signals from the two flip-flops, not specifically illustrated, in a scale-of-three counter 226 are applied to a gating network 227 which is coupled, in turn, the three output conductors 229, 230 and 231 corresponding to the first, second and third responders, respectively. Conductor 229 is coupled to the "and" gating circuits in the fine, intermediate and coarse data input groups corresponding to the first responder. In the same way, conductor 230 is applied to the remaining input terminal of those gating circuits associated to the second responder while conductor 231 goes to the remaining input terminal in final series of "and" gates associated with the third responder. The output terminals of the 225–1 set of "and" gates are applied to the respective input terminals of "or" circuit 234–1 whose output signal is passed through a zero-crossing detector 235–1 to the "off" input terminal of a flip-flop 236–1. In the same way, the output signals from the 225–2 set of "and" gates are applied to an "or" circuit 234–2 whose output signal is passed through a zero-crossing detector 235–2 to the "off" input terminal of a flip-flop 236–2. In the same way, the output signals of the 225–3 set of "and" gates are applied to an "or" circuit 234–3 whose output signal is passed through a zero-crossing detector 235–3 to the "off" input terminal of a flip-flop 236–3.

The 599 c.p.s. reference signal is passed through a zero-crossing detector 238 to the "off" input terminal of a flip-flop 239. The output signal of a clock source 241 is applied both to the counting input terminal of scale-of-three counter 226 and to the "on" input terminal of flip-flop 239. The similar or corresponding "on" output signal of flip-flop 239 is applied to one input terminal of an "and" circuit 242 while the output signal from zero-crossing detector 238 is applied to the other input terminal of circuit 242. The output signal from gate 242 is applied to the "on" input terminal of each of flip-flops 236–1, 236–2 and 236–3. The "on" output signals from flip-flops 236–1, 236–2 and 236–3 are applied to one input terminal of each of "and" gating circuits 242–1, 242–2 and 242–3, respectively. The 599 c.p.s. reference signal is applied through a multiply-by-1024 frequency multiplier to form a 613 kc. reference signal which is applied to the other input terminals of each of "and" circuits 242–1, 242–2 and 242–3.

The output signals from "and" circuits 242–1, 242–2 and 242–3 are applied to the counting input terminals of counters 244–1, 244–2 and 244–3, respectively. The clock signal from clock source 241 is applied to a reset terminal of each of counters 244–1, 244–2 and 244–3. The output conductors of all of the flip-flops, not specifically shown, within the three counter units are coupled to format converter 240. Finally, the output from converter 240 is illustrated as being applied to a recorder, shown generally at 246.

The output signal frequency of clock source 241 determines the basic data sampling rate of the system. Its output signal is counted by a scale-of-three counter 226 and gating network 227 decodes the resulting count to consecutively energize output conductors 229, 230 or 231. The conductor thus energized caused an output reading taken corresponding to its particular responder.

The counter 226 count is changed upon each appearance of a source 241 pulse and the next network 227 output line is energized hence beginning the next sampling interval for the next responder. An associated "and" gate in each of the fine, intermediate, and coarse groups is enabled, and, simultaneously therewith, flip-flop 239 is turned "on" and "and" gate 242 enabled. Then, the next zero crossing of the reference signal, detected by zero-crossing detector 238, is passed by gate 242 to turn each of the 236 series of flip-flops to their "on" state. The resulting "on" states act to enable their corresponding series of "and" circuits 242 and the 613 kc. signal is passed through them to the corresponding series of 244 counters where it is counted. The reference signal counting continues in each data channel until the gated responder data signal crosses zero, as detected individually by the 235 series of zero-crossing detectors. Each zero-crossing, corresponding, in turn, to the phase difference between the reference and its particular data signal, serves to turn its corresponding flip-flop in series 236 "off" thereby disabling the associated "and" circuit 242 and halting the reference signal counting. The count remaining in each counter is a direct function of the phase difference between the reference and associated data signal and hence represents the channel's slant range.

Since the 613 kc. signal is exactly 1024 times the frequency of the 599 signal, each of the series of 244 counters should preferably be 10 binary bits in length, that is, be formed of 10 flip-flops which, in turn, correspond to the maximum count possible between the data and reference signals according to the maximum phase difference, which will be 1024. Once the series of flip-flops 236 have been turned "off," nothing further is done in the circuitry as detailed until the appearance of the next clock pulse from source 241 which activates counter 226 to its next count with the previously described cycle of operation being repeated in similar fashion.

The counter outputs, presented in parallel to format counter 240 may be manipuated in any one of a large number of ways as required for the specific system's use, the particular way not forming a portion of the present invention. The ambiguities between the fine, intermediate and coarse channel numbers may be resolved in the general manner described in connection with FIGURES 6 and 7 in the issued U.S. Patent No. 2,991,462, entitled "Phase-to-Digital and Digital-to-Phase Converter," having the same inventor as the present invention. Or, the numbers derived each cycle may be manipulted into some suitable or desired format and recorded on recorder 246, which may, for example, be magnetic tape. Clock source 241 could be a manually operated pushbutton, for example, or could be arranged to produce a burst of three consecutive clock signals to get the three slant range readings in close order. Such a burst could be initiated, for example, by shutter actuation in an aerial photography operation and the information in the resulting data frame would represent the point in space where the associated picture was taken.

It will be appreciated by those skilled in the art that the specific embodiment set forth for illustrating the present invention represents only one of a number of possible variations capable of achieving substantially the same result without involving invention. For example, a larger number of responder stations could be employed, each additional station requiring an additional keying tone. In addition, a responder readout station, as shown, could be associated with a responder receiver only, the two being located apart from all of the responder stations, and a complete slant range information still obtained. Then too, the various specific frequencies given for the carrier signals, ranging signals, and keying tones are for illustrative purposes only and may be varied in detail, as understood by those skilled in the art. Then too, additional external information sources, and corresponding channels may be employed for telemetering additional types of information from the interrogator to the responder. In the same way, external information may likewise be telemetered from the various responders to the interrogator. It will also be appreciated that the various circuits given in block diagrammatic form may individually take many detailed embodiments as are known in the art and found in various textbooks, periodicals, etc. without involving invention.

Finally, it will be appreciated by those skilled in the art, that the foregoing description relates only to one detailed preferred embodiment of the present invention whose scope and spirit are set forth in the embodied claims.

What is claimed is:

1. The electronic slant range measuring system comprising:
   interrogator means transmitting a plurality of ranging signals and sequentially transmitting a series of keying signals;
   a series of responder means corresponding to said series of keying signals, respectively, each of said responder means being responsive to the receipt of the plurality of ranging signals and its corresponding keying signals for transmitting pluralities of received ranging signals;
   receiver means associated with said interrogator means for receiving the plurality of ranging signals transmitted by each of said responder means;
   a series of output means corresponding to said series of responder means, respectively, each of said output means being responsive to the plurality of ranging signals received by said receiver means from its corresponding responder means for producing signal phase information corresponding to the slant range distance between said interrogator means and its corresponding responder means; and
   telemetering means associated with said interrogator means and responsive to each plurality of ranging signals received by said receiver means for telemetering said plurality of ranging signals, a second series of output means corresponding to said series of responder means, respectively;
   each output means of said second series of output means being responsive to the plurality of ranging signals telemetered by said telemetering means corresponding to its associated responder means for producing signal phase information which includes the slant range distance between the interrogator means and its associated responder means.

2. The electronic slant range measuring system according to claim 1 in which each of said second series of output means includes a plurality of oscillator means corresponding to said plurality of ranging signals, respectively, telemetered by said telemetering means, each of said oscillator means normally producing an output signal and responsive when actuated for phase-locking its output signal with its corresponding telemetered ranging signal, each of said output means additionally including means responsive to the transmission of the keying signal corresponding to its associated responder means for actuating each of its included oscillator means whereby the output signal produced by each of the plurality of oscillator means in each of said series of output means is in substantial phase-lock at all times with the ranging signal telemetered by said telemetering means.

3. The electronic slant range measuring system according to claim 2 including, in addition, a second plurality of phase measuring means corresponding to said plurality of ranging signals, respectively, and associated with said second series of output means, each of said second plurality of phase measuring means being responsive to applied first and second input signals for producing an output indication representing the phase difference therebetween, means for applying at least one of the plurality of ranging signals transmitted by said interrogator means as a first signal to each of said second plurality of phase measuring means and means for sequentially applying the output signals produced by the plurality of oscillator means in said second series of output means as second signals to said second plurality of phase measuring means, respectively, whereby output indications are sequentially produced by said second plurality of phase measuring means representing the phase shifts between the plurality of ranging signals telemetered by said telemetering means and a plurality of ranging signals transmitted by said interrogator means.

4. The electronic slant range measuring system according to claim 3 in which each of said second plurality of phase measuring means includes counting means responsive when energized for producing a count corresponding to the duration of its energization, and means for energizing each of the counting means in said second plurality of phase measuring means for a duration corresponding to the pase difference for at least one cycle in each of the sequential applications of said first and second input signals whereby said output indications are in the form of numerical information.

5. The electronic slant range measuring system according to claim 4 including, in addition, an information source associated with said interrogator means, means for producing a signal whose phase relationship with one of said ranging signals represents the information contained in said information source, additional transmitting means associated with said interrogator means for transmitting the signal produced by the last-named means, and means associated with the second series of output means and responsive to the signal transmitted by said additional transmitting means and to said one ranging signal for producing an output indication of the phase relationship therebetween and hence of the information represented by said information source.

6. An electronic slant range measuring system comprising: interrogator means transmitting a plurality of ranging signals and sequentially transmitting a series of keying signals; a series of responder means corresponding to said series of keying signals, respectively, each of said series of responder means being responsive to the receipt of the plurality of ranging signals and its corresponding keying signals for transmitting the plurality of received ranging signals; receiver means associated with said interrogator means for receiving the plurality of ranging signals transmitted by each of said series of responder means; telemetering means responsive to the plurality of ranging signals received by said receiver means for telemetering said plurality of ranging signals to said series of responder means, and a series of output means corresponding to said series of responder means, respectively, each of the series of output means being responsive to the plurality of ranging signals transmitted by said interrogator means and telemetered by said telemetering means for producing signal phase information including the slant range between the interrogator means and its corresponding responder means.

7. The electronic slant range measuring system according to claim 6 including, in addition, conversion means responsive when coupled to one of said series of output means for producing output information corresponding to the signal phase information in said output means, and means for sequentially coupling said conversion means to said series of output means whereby successive output information is produced corresponding to the slant ranges between the interrogator means and each of said series of responder means.

8. An electronic slant range measuring system comprising: interrogator means transmitting at least one ranging signal; responder means for intermittently receiving and retransmitting the ranging signal transmitted by said interrogator means; receiver means associated with said interrogator means for receiving the ranging signal transmitted by said responder means; oscillator means associated with said interrogator means producing an output signal, and said oscillator means being responsive when actuated for phase-locking its output signal with said received ranging signal; and means responsive to each intermittent retransmission of said ranging signal by said responder means for actuating said oscillator means whereby the output signal produced by said oscillator means is substantially in phase-lock with the received ranging signal at all times and its phase relationship with the ranging signal transmitted by said interrogator means represents information of the slant range between said interrogator and said responder.

9. The electronic slant range measuring system according to claim 8 including memory means for driving said oscillator means between the actuations of said oscillator means, said memory means storing driving signal information during the actuated intervals of said oscillator means corresponding to the existing phase of said received ranging signal and the rate of change of phase of said received ranging signal, said memory means driving said oscillator means between its said actuations such that its output signal follows the phase and rate of change of phase of the received ranging signal.

10. An electronic slant range measuring system comprising: interrogator means transmitting at least one ranging signal; first receiver means for intermittently receiving the ranging signal transmitted by said interrogator means; transmitter means associated with said first receiver means for retransmitting the ranging signal received thereby; interrogator receiver means associated with said interrogator means for receiving the ranging signal retransmitted by said transmitter means; telemetering means associated with said interrogator means for telemetering the ranging signal received by said interrogator receiver means; second receiver means associated with said first receiver means for receiving the ranging signal telemetered by said telemetering means; first and second range memory means corresponding to said first and second receiver means, respectively, each of said range memory means including oscillator means normally producing an output signal and responsive when actuated for phase locking its output signal with an applied input signal; means for applying the range signals received by said first and second receiver means as input signals to said first and second range memory means, respectively; means responsive to each receipt of the range signal transmitted by said interrogator means for actuating said first and second range memory means whereby the output signals produced by said first and second range memory means are in substantial phase lock with the range signals received by said first and second receiver means, respectively; and readout means responsive to the output signals produced at any time by said first and second range memory means for producing an output reading corresponding to their phase differences, said output reading corresponding to the slant range between said interrogator and said first receiver means.

11. A distance measuring system comprising: interrogator means including transmitter means transmitting a carrier signal periodically modulated by at least one ranging signal; responder means including wide-band I.-F. receiver means for receiving the carrier signal transmitted by said interrogator transmitter means and for producing an I.-F. carrier signal modulated by said ranging signal during its appearance in the received signal, narrow-band I.-F. receiver means responsive to the unmodulated carrier signal transmitted by the transmitter means of said interrogator means for maintaining the I.-F. carrier signal produced by said wide-band I.-F. receiver means at a predetermined phase and frequency whereby slant range measuring accuracy is maintained in the range signal modulated on said I.-F. carrier signal during its appearance, first demodulating means responsive to said I.-F. carrier signal for producing said ranging signal during its appearance, and transmitting means for transmitting the ranging signal produced by said first demodulating means; said interrogator means including, in addition, means for receiving the ranging signal transmitted by the transmitter means in said responder means, subcarrier means associated with the transmitter means in said interrogator means for retransmitting the range signal received from the transmitting means of said responder means on a subcarrier signal; the wide-band I.–F. receiver means of said responder means additionally passing said subcarrier signal; said responder means, including, in addition, second demodulator means for demodulating the subcarrier signal passed by said wide-band I.–F. receiver means to produce another ranging signal; and readout means for measuring the phase difference between the range signals produced by said first and second demodulator means whereby slant range information between said interrogator and said responder is obtained.

12. A distance measuring system comprising: interrogator means including means for generating a first carrier signal, ranging signal generating means for producing a series of ranging signals, means responsive at periodic intervals for modulating the series of ranging signals on said first carrier signal, and means for transmitting the modulated first carrier signal; and responder means including receiver means for receiving the transmitted first carrier signal, I.–F. amplifier means responsive to the signal received by said receiver means for producing a first I.–F. carrier signal, said first I.–F. carrier signal being modulated by said series of ranging signals when they appear modulated on said received signal, narrow-band I.–F. means responsive to the signal received by said receiver means when not modulated by said series of ranging signals for maintaining said first I.–F. carrier signal at a predetermined phase and frequency, wide-band I.–F. means responsive to said first I.–F. carrier signal when modulated by said series of ranging signals for demodulating said series of ranging signals, means for applying the series of ranging signals demodulated by said wide-band I.–F. means as a series of feedback signals, respectively, to said receiver means whereby modulation wipe-off is effected and internal circuit phase shifts produced in the series of ranging signals are cancelled, means for producing a second carrier signal, modulating means for modulating the series of ranging signals demodulated by said wide-band I.–F. means on said second carrier signal, and transmitter means for transmitting the modulated output signal produced by said modulating means, said interrogator means including, in addition, receiver means for receiving the signal transmitted by the transmitter means in said responder means, and demodulating means for demodulating the series of ranging signals appearing in the signal received by the receiver means in said interrogator means, the phase differences between the series of ranging signals produced by the ranging signal generating means and the series of ranging signals demodulated by the interrogator demodulating means corresponding to the slant range between said interrogator means and said responder means.

13. The distance measuring system according to claim 12 in which said interrogator means includes, in addition, subcarrier signal generating means for producing a series of subcarrier signals corresponding to said series of ranging signals, respectively, means for modulating each of said series of ranging signals demodulated by said interrogator demodulating means on its corresponding subcarrier signal, and means for modulating the series of modulated subcarrier signals on said first carrier signal whereby the series of ranging signals are telemetered back to said responder means, said series of subcarrier signals, also appearing in said first I.–F. carrier signal in said responder means and being demodulated by the wide-band I.–F. means is in said responder means, said responder means including, in addition, subcarrier signal demodulating means for demodulating the series of subcarrier signals to produce said series of ranging signals whereby the phase differences between the series of ranging signals produced by said subcarrier demodulating means and the series of ranging signals demodulated by the wide-band I.–F. means in said responder means represents the slant range between said interrogator and said responder.

14. An electronic slant range measuring system comprising: mobile interrogator means transmitting at least one ranging signal; at least one stationary responder means at a predetermined location for receiving the ranging signal transmitted by said interrogator means and retransmitting said ranging signal; receiver means associated with said interrogator means for receiving the ranging signal retransmitted by said responder means; and telemetering means for transmitting the ranging signal received from said responder means whereby phase difference information representing the slant range between the responder and interrogator means exists at both the interrogator means and the responder means for determining slant range from the predetermined location to said mobile interrogator means.

15. An electronic slant range measuring system comprising: mobile interrogator means transmitting a plurality of ranging signals and sequentially transmitting a series of keying signals; a series of stationary responder means corresponding to said series of keying signals, respectively, each one of said series of responder means being located at a different predetermined spatial location and each one of said series being responsive to the receipt of the plurality of ranging signals and its corresponding keying signals for transmitting the plurality of received ranging signals; receiver means associated with said interrogator means for receiving the plurality of ranging signals transmitted by said series of responder means; telemetering means responsive to the plurality of ranging signals received by said receiver means for telemetering said plurality of ranging signals to said series of responder means, and a series of output means corresponding to said series of responder means, respectively, each one of the series of output means being responsive to the plurality of ranging signals transmitted by said interrogator means and telemetered by said telemetering means for producing signal phase information including the slant range between the interrogator means and its corresponding responder means, whereby the spatial location of said interrogator means can be uniquely determined from the slant range to each one of said series of stationary responder means.

16. The electronic slant range measuring system according to claim 15 including, in addition, conversion means responsive when coupled to one of said series of output means for producing output information corresponding to the signal phase information in said output means, and means for sequentially coupling said conversion means to said series of output means whereby successive output information is produced corresponding to the slant ranges between the interrogator means and each one of said series of responder means.

17. An electronic slant range measuring system comprising: mobile interrogator means transmitting at least one ranging signal; stationary responder means at a predetermined spatial location for intermittently receiving and retransmitting the ranging signal transmitted by said interrogator means; receiver means associated with said interrogator means for receiving the ranging signal retransmitted by said responder means; oscillator means associated with said interrogator means producing an output signal, said oscillator means being responsive when actuated for phase-locking its output signal with said received ranging signal; and means responsive to each intermittent retransmission of said ranging signal by said responder means for actuating said oscillator means whereby the output signal produced by said oscillator means is substantially in phase-lock with the received ranging signal retransmitted by said responder means, at all times, and its phase relationship with the ranging signal transmitted by said interrogator means represents information of the slant range between said mobile interrogator and said stationary responder, 18. The electronic slant range measuring system according to claim 17 including memory means for driving said oscillator means between the actuations of said oscillator means, said memory means storing driving signal information during the actuated intervals of said oscillator means corresponding to the existing phase of said received ranging signal and the rate of change of phase of said received ranging signal, said memory means driving said oscillator means between its said actuations such that its output signal follows the phase and rate of change of phase of the received ranging signal.

19. An electronic slant range measuring system comprising: mobile interrogator means transmitting at least one ranging signal; stationary first receiver means at a predetermined location in space for intermittently receiving the ranging signal transmitted by said interrogator means; transmitter means associated with said first receiver means for retransmitting the ranging signal received thereby; interrogator receiver means associated with said interrogator means for receiving the ranging signal retransmitted by said transmitter means; telemetering means associated with said interrogator means for telemetering the ranging signal received by said interrogator receiver means; second receiver means associated with said first receiver means for receiving the ranging signal telemetered by said telemetering means; first and second range memory means corresponding to said first and second receiver means, respectively, each of said range memory means including oscillator means normally producing an output signal and responsive when actuated for phase locking its output signal with an applied input signal; means for applying the range signals received by said first and second receiver means as input signals to said first and second range memory means, respectively; means responsive to each receipt of the range signal transmitted by said interrogator means for actuating said first and second range memory means whereby the output signals produced by said first and second range memory means are in substantial phase lock with the range signals received by said first and second receiver means, respectively; and readout means responsive to the output signals produced at any time by said first and second range memory means for producing an output reading corresponding to their phase differences, said output reading corresponding to the slant range between said mobile interrogator and said stationary first receiver means for spatially locating said interrogator means with respect to said predetermined location.

References Cited by the Examiner

UNITED STATES PATENTS

| | | | |
|---|---|---|---|
| 2,410,523 | 11/1946 | Rankin | 331—12 |
| 2,414,469 | 1/1947 | Isbister | 343—6 |
| 2,519,935 | 8/1950 | Smith et al. | 343—6 |
| 2,589,808 | 3/1952 | Hirsch | 343—6 |
| 2,903,692 | 9/1959 | Morgan et al. | 343—12 |
| 3,029,426 | 4/1962 | Robinson | 343—6 |
| 3,085,242 | 4/1963 | Werner et al. | 343—6.5 |
| 3,111,665 | 11/1963 | Werner | 343—6.8 |
| 3,153,232 | 10/1964 | Fletcher et al. | 343—112.4 |
| 3,181,143 | 4/1965 | Villiers | 343—6.5 |
| 3,187,327 | 6/1965 | Schneider et al. | 343—6.5 |

CHESTER L. JUSTUS, *Primary Examiner.*